(12) United States Patent
Bickham et al.

(10) Patent No.: US 6,789,960 B2
(45) Date of Patent: Sep. 14, 2004

(54) METHOD OF CONNECTING OPTICAL FIBERS, AN OPTICAL FIBER THEREFOR, AND AN OPTICAL FIBER SPAN THEREFROM

(75) Inventors: Scott R. Bickham, Corning, NY (US); Michael B. Cain, Corning, NY (US); Pamela A. Hajcak, Corning, NY (US); Martin Hempstead, Painted Post, NY (US); Lisa L. Hepburn, Corning, NY (US); Stephan L. Logunov, Corning, NY (US); Lewis Kirk Klingensmith, Corning, NY (US); Richard E. Rebis, Corning, NY (US)

(73) Assignee: Corning Incorporated, Corning, NY (US)

( * ) Notice: Subject to any disclaimer, the term of this patent is extended or adjusted under 35 U.S.C. 154(b) by 123 days.

(21) Appl. No.: 10/159,679

(22) Filed: May 31, 2002

(65) Prior Publication Data

US 2003/0063875 A1 Apr. 3, 2003

Related U.S. Application Data

(60) Provisional application No. 60/303,458, filed on Jul. 6, 2001.

(51) Int. Cl.[7] .............................. G02B 6/26; G02B 6/255
(52) U.S. Cl. .............................. 385/96; 385/27; 385/30; 385/95
(58) Field of Search .............................. 385/27, 30, 95, 385/96

(56) References Cited

U.S. PATENT DOCUMENTS

| 4,102,717 A | 7/1978 | Hensel | 156/64 |
| 4,313,744 A | 2/1982 | Toda | 65/4.21 |
| 4,326,870 A | 4/1982 | Bendit et al. | 65/4.21 |
| 4,475,935 A | 10/1984 | Tanaka et al. | 65/3.41 |
| 4,755,022 A | 7/1988 | Ohashi et al. | 350/96.33 |
| 4,798,438 A * | 1/1989 | Moore et al. | 385/43 |

(List continued on next page.)

FOREIGN PATENT DOCUMENTS

| DE | 36 09 409 | 9/1987 | G02B/6/26 |
| DE | 36 38 861 | 5/1988 | G02B/6/24 |
| EP | 0340042 | 11/1989 | |
| EP | 0 582 894 B1 | 2/1994 | G02B/6/255 |
| EP | 0 582 894 A1 | 2/1994 | G02B/6/255 |
| EP | 0 664 464 A1 | 7/1995 | G02B/6/16 |
| EP | 0 775 924 | 5/1997 | G02B/6/16 |
| EP | 0 890 853 | 1/1999 | G02B/6/255 |
| EP | 0 942 297 | 9/1999 | G02B/1/02 |
| EP | 1 063 544 | 12/2000 | G02B/6/255 |
| EP | 1 094 346 | 4/2001 | G02B/6/255 |
| EP | 1 174 741 | 1/2002 | G02B/6/255 |
| EP | 1 184 693 | 3/2002 | G02B/6/255 |
| EP | 1 202 090 | 5/2002 | G02B/6/255 |

(List continued on next page.)

OTHER PUBLICATIONS

Edvold B. et al.; "New Technique for Reducing the Splice Loss to Dispersion Compensating Fiber"; Proceedings of the European Conference on Optical Communications; vol. 2; Sep. 15, 1996; pp. 2245–2248.

W. Zheng; "Erbium Doped Fiber Splicing and Splice Loss Estimation"; IEEE Journal of Lightwave Technology, vol. 12, No. 3, Mar. 1994 pp. 430–435.

(List continued on next page.)

Primary Examiner—John D. Lee
Assistant Examiner—Tina M Lin
(74) Attorney, Agent, or Firm—Joseph M. Homa

(57) ABSTRACT

A bridge fiber and a method of connecting two other dissimilar optical waveguide fibers is presented. The bridge fiber may be utilized to connect positive dispersion fibers or step index single mode fibers to compensative fibers, such as dispersion compensation fibers or dispersion-slope compensation fibers.

36 Claims, 15 Drawing Sheets

U.S. PATENT DOCUMENTS

| | | | |
|---|---|---|---|
| 4,852,968 A | 8/1989 | Reed | 350/96.33 |
| 4,900,114 A | 2/1990 | Mortimore et al. | 350/96.15 |
| 4,954,152 A | 9/1990 | Hsu et al. | 65/3.1 |
| 4,958,905 A | 9/1990 | Tynes et al. | 350/96.21 |
| 5,074,633 A | 12/1991 | Cohen et al. | 385/43 |
| 5,085,493 A | 2/1992 | Zell et al. | 385/96 |
| 5,142,603 A | 8/1992 | Forrester | 385/98 |
| 5,301,252 A | 4/1994 | Yanagawa et al. | 385/96 |
| 5,351,323 A | 9/1994 | Miller et al. | 385/28 |
| 5,381,503 A | 1/1995 | Kanamori et al. | 385/123 |
| 5,446,820 A | 8/1995 | Ishikawa et al. | 385/123 |
| 5,638,476 A | 6/1997 | Zheng | 385/96 |
| 5,649,044 A | 7/1997 | Bhagavatula | 385/124 |
| 5,852,701 A | 12/1998 | Kato et al. | 385/127 |
| 5,930,421 A | 7/1999 | Sakano | 385/38 |
| 6,049,643 A | 4/2000 | Lee et al. | 385/28 |
| 6,062,743 A | 5/2000 | Zheng et al. | 385/95 |
| 6,084,993 A | 7/2000 | Mukasa | 385/24 |
| 6,125,225 A | 9/2000 | Dianov et al. | 385/124 |
| 6,173,095 B1 | 1/2001 | Sakano | 385/38 |
| 6,244,757 B1 | 6/2001 | Kim et al. | 385/96 |
| 6,275,627 B1 | 8/2001 | Wu | 385/28 |
| 6,336,749 B1 | 1/2002 | O'Toole et al. | 385/96 |
| 6,526,209 B1 * | 2/2003 | Hasegawa et al. | 385/127 |
| 2002/0034364 A1 | 3/2002 | Veng | 385/96 |

FOREIGN PATENT DOCUMENTS

| | | | |
|---|---|---|---|
| EP | 1 217 400 | 6/2002 | G02B/6/287 |
| EP | 1 219 987 | 7/2002 | G02B/6/255 |
| EP | 1 229 358 | 8/2002 | G02B/6/16 |
| GB | 1 373 543 | 11/1974 | G02B/5/14 |
| GB | 2 105 060 | 3/1983 | G02B/5/14 |
| JP | 3-190598 | 8/1991 | H02P/9/04 |
| JP | 4-98203 | 3/1992 | G02B/6/24 |
| JP | 4-260007 | 9/1992 | G02B/6/26 |
| JP | 5-88038 | 4/1993 | G02B/6/14 |
| JP | 5-215931 | 8/1993 | G02B/6/255 |
| JP | 6-174961 | 6/1994 | G02B/6/255 |
| JP | 7-84142 | 3/1995 | G02B/6/255 |
| JP | 8-220361 | 8/1996 | G02B/6/14 |
| JP | 2001-116949 | 4/2001 | G02B/6/255 |
| WO | WO86/04689 | 8/1986 | |
| WO | WO 97/33188 | 12/1997 | |
| WO | WO99/26094 | 5/1999 | G02B/6/22 |
| WO | WO00/07048 | 2/2000 | G02B/6/02 |
| WO | WO00/10043 | 2/2000 | G02B/6/16 |
| WO | WO00/19256 | 4/2000 | G02B/6/26 |
| WO | WO00/37977 | 6/2000 | G02B/6/16 |
| WO | WO00/38356 | 6/2000 | H04B/10/18 |
| WO | WO00/39620 | 7/2000 | G02B/6/42 |
| WO | WO00/65387 | 11/2000 | G02B/6/22 |
| WO | WO01/11402 | 2/2001 | G02B/6/22 |
| WO | WO01/33266 | 5/2001 | G02B/6/255 |
| WO | WO02/052318 | 7/2002 | G02B/6/287 |
| WO | WO00/67053 | 11/2002 | G02B/6/16 |

OTHER PUBLICATIONS

K. Ando et al, "Low–Loss Optical Connector Between Dissimilar Single–Mode Fibers Using Local Core Expansion Technique by Thermal Diffusion", IEEE Photonics Technology Letters, vol. 4, No. 9, Sep. 1992, pp. 1028–1031.

A. Antos et al, "Design and Characterization of Dispersion Compensating Fiber Based on the $LP_{01}$ Mode", Journal of Lightwave Technology, vol. 12, No. 10, Oct. 1994, pp. 1739–1745.

C.P. Botham, "Theory of Tapering Single–Mode Optical Fibres by Controlled Core Diffusion", Electronics Letters, Feb. 18, 1988, vol. 24, No. 4, pp. 243–245.

C.P. Botham et al., "Design of Adiabatic Tapers Produced by Controlled Core Diffusion", Electronics Letters, Oct. 26, 1989, vol. 25, No. 22, pp. 1520–1522.

L. Grüner–Nielsen et al, "Dispersion Compensating Fibers", Optical Fiber Technology 6, pp. 164–180 (2000).

T. Haibara et al, "Connection Loss Reduction by Thermally–Diffused Expanded Core Fiber", IEEE Photonics Technology Letters, vol. 3, No. 4, Apr. 1991, pp. 348–350.

H. Hanafusa et al, "Thermally–Diffused Expanded Core Fibers for Low–Loss and Inexpensive Photonic Components", Electronics Letters, Oct. 10, 1991, vol. 27, No. 21, pp. 1968–1969.

O. Hanaizumi et al, "Fabrication of an Expanded Core Fiber Having MFD of 40 μm Preserving Outer Diameter", IEEE Photonics Technology Letters, vol. 6, No. 7, Jul. 1994, pp. 842–844.

J.S. Harper et al, "Tapers in Single–Mode Optical Fibre by Controlled Core Diffusion", Electronics Letters, Feb. 18, 1988, vol. 24, No. 4, pp. 245–246.

M. Kihara et al, "Characteristics of Thermally Expanded Core Fiber", Journal of Lightwave Technology, vol. 14, No. 10, Oct. 1996, pp. 2209–2214.

M. Kihara et al, "Loss Characteristics of Thermally Diffused Expanded Core Fiber", IEEE Photonics Technology Letters, vol. 4, No. 12, Dec. 1992, pp. 1390–1391.

G. Kweon et al, "Splicing Losses Between Dissimilar Optical Waveguides", Journal of Lightwave Technology, vol. 17, No. 4, Apr. 1999, pp. 690–703.

Y. Li et al, "Cladding–mode assisted fiber–to–fiber and fiber–to–free–space coupling", Optics Communications 183, Sep. 15, 2000, pp. 377–388.

J. Nishimura et al, "Mode–Field Expansion and Reduction in Dispersive Fibers by Local Heat Treatments", IEEE Journal of Selected Topics in Quantum Electronics, vol. 5, No. 5, Sep./Oct. 1999, pp. 1260–1265.

J. Nishimura et al, "Control of Spectral Characteristics of Dispersive Optical Fibers by Annealing", Journal of Lightwave Technology, vol. 15, No. 2, Feb. 1997, pp. 294–298.

Y. Ohtera et al, "Numerical Analysis of Eigenmodes and Splice Losses of Thermally Diffused Expanded Core Fibers", Journal of Lightwave Technology, Vo. 17, No. 12, Dec. 1999, pp. 2675–2682.

K. Shiraishi et al, "Light–Propagation Characteristics in Thermally Diffused Expanded Core Fibers", Journal of Lightwave Technology, vol. 11, No. 10, Oct. 1993, pp. 1584–1591.

H.R.D. Sunak et al, "Splice Loss in Dispersion–Modified Single–Mode Silica Fibers: Effect of Non–Gaussian Fields", IEEE Photonics Technology Letters, vol. 1, No. 6, Jun. 1989, pp. 146–148.

H.Y. Tam, "Simple Fusion Splicing Technique for Reducing Splicing Loss Between Standard Singlemode Fibres and Erbium–Doped Fibre", Electronics Letters, Aug. 15, 1991, vol. 27, No. 17, pp. 1597–1599.

S. Tammela et al, "Triple Layer Refractive Index Profile for Tapered Fibre Beam Expanders", Electronics Letters, Aug. 31, 1989, vol. 25, No. 18, pp. 1205–1206.

S. Yin et al, "A new design for non–zero dispersion–shifted fiber (NZ–DSF) with a large effective area over 100 $μm^2$ and low bending and splice loss", Optics Communications 177, Apr. 2000, pp. 225–232.

Q. Yu et al, "Refractive–Index Profile Influences on Mode Coupling Effects at Optical Fiber Splices and Connectors", Journal of Lightwave Technology, vol. 11, No. 8, Aug. 1993, pp. 1270–1273.

* cited by examiner

METHOD OF CONNECTING OPTICAL FIBERS, AN OPTICAL FIBER THEREFOR, AND AN OPTICAL FIBER SPAN THEREFROM

This application claims the benefit of priority under 35 U.S.C. §119(e) of U.S. Provisional Application Serial No. 60/303,458 filed on Jul. 6, 2001.

BACKGROUND OF THE INVENTION

1. Field of the Invention

The present invention relates to the connection of optical fibers having different optical properties. More particularly, the present invention relates to an optical fiber which can be used as a bridge to connect two other optical fibers. While the invention may be suitable for a wide range of connectivity applications in telecommunications systems, a fiber disclosed herein is especially well suited for connecting step index single mode fibers to dispersion compensation fibers having complex refractive index profiles, and will be particularly described in that regard.

2. Technical Background

Dispersion compensation techniques may be successfully used in telecommunications systems or links. Total dispersion, or chromatic dispersion, may be compensated by an appropriately designed waveguide fiber contained in a dispersion compensating module that can be inserted into the link at an access point such as an end of the link. The compensating waveguide fiber can be designed to allow operation in, for example, the 1550 nm operating wavelength window of a link that was originally designed for the 1310 nm operating window. A disadvantage of compensating with a module is that attenuation and nonlinear penalties are added to the link without increasing the useful link length. Furthermore, refractive index profile designs for such dispersion compensation are typically more complex, more difficult to manufacture, and may have higher attenuation than the so-called transmissive fibers making up the link. In some designs, the compensation parameters may be achieved at the expense of the effective area of the optical fiber, but a lower effective area compensating waveguide fiber is more susceptible to non-linear effects.

Another approach to dispersion compensation is providing both positive and negative dispersion fibers in the cables of the link, wherein both the positive and negative dispersion fibers are transmissive fibers, that is, the compensative fiber or fibers are not wound around bobbins inside a module, but rather add to the useful link length. Each cable can contain both positive and negative total dispersion waveguide fibers, or the link can be formed using cables having only positive dispersion in conjunction with cables having only negative dispersion. However, as in the dispersion compensating module approach, a relatively high attenuation and low effective area of the negative dispersion fiber can be problematic in this approach as well. Furthermore, cable inventory must typically be managed carefully, because replacing or repairing a cable may involve tracking of one or more other variables, such as the sign of the dispersion of fibers in the cable. In certain profile designs, a mismatch of mode fields between the positive and negative total dispersion fibers may exist, resulting in relatively large or excessive splice or connecting losses.

In the latter approach, uncoiled lengths of optical fibers such as single mode fibers and compensative fibers such as dispersion compensating fibers can be effectively used together in optical systems, although to achieve desirable or necessary system performance, such fibers typically need to be connected or spliced by other optical fibers or optical devices without exhibiting excessive connection losses or "splice losses". Typically, the positive dispersion single mode transmissive fibers have mode field diameters that differ in size and in other aspects from the mode field diameters of the negative dispersion compensative fibers to which the single mode fibers will be connected. The direct connection of fibers having such mismatched mode field diameters generally results in excessive splice loss.

A number of techniques have been developed over the years to limit the adverse effect of splice loss resulting from mode field diameter mismatch. Heretofore, physical tapering, in-line optical devices, and thermally diffused expanded core ("TEC") methods have been employed in an attempt to adequately match the mode fields of fibers and other devices having different mode field diameters. Physical tapering includes both down-tapering and up-tapering. TEC methods include those methods used to expand the mode field diameter via diffusion.

In the down-tapering method, the optical fiber is first fusion-spliced by conventional methods, and the spliced portion of the fiber is thereafter heated so that it can be stretched by pulling. In this way, the softened spliced portion develops a tapered shape. The reduced core misalignment due to the tapered shape and the spreading of the mode field diameter in the smaller core diameter fiber typically result in lower splice loss when compared to the original non-tapered splice. However, the tapers fabricated by this method are sensitive to physical perturbations or external refractive-index change because the mode field is no longer tightly bound to the core. In addition, the outer diameter of the tapered fiber changes during the drawing process, thus special fiber plugs are typically required for connections.

An up-taper is fabricated at the stage of drawing a preform and results in an enlarged core. The enlargement of the core results in an expanded mode field diameter. This method is typically applicable for mechanical splicing, bonded splicing, or connectors between an erbium-doped fiber ("EDF") and a single mode fiber. However, this method also requires special plugs for the connectors, and additionally requires a special preform.

The thermally diffused expanded core method entails heating a fiber to cause dopant diffusion to expand the mode field diameter. Generally, the fusion connection of two fibers with different mode field diameters with this method is made by continuously or adiabatically varying the core diameters of one or both fibers so that the mode field diameters match at their boundaries. During the process of dopant diffusion, the core diameter locally becomes large, and the relative refractive index difference locally becomes small, resulting in a tapered core and a tapered mode field diameter along the length of the fiber. Accordingly, the thermally diffused expanded core method can be an effective method for locally expanding the fiber mode field diameter. However, implementation of the thermally diffused expanded core technique generally involves either heat-treating a smaller mode field diameter fiber in a furnace or a gas burner, then fusion-connecting the expanded fiber with the larger mode field diameter fiber, or first fusion-connecting the two fibers, then applying additional heat to diffuse the fused region.

When furnaces or microburners are employed to provide the heat for the diffusion, the process typically takes several hours to complete, due to the temperature limits of most furnaces, and may require the application of a carbon coating once the primary coating has been stripped from the fiber to reduce the heat exposure time required to properly diffuse the dopant. However, application of a carbon coating is expensive and time consuming. Furthermore, long periods of exposure to a gas flame tends to make a fiber brittle even if temperatures within the furnace are not extreme. Thus, for example, open-ended furnaces having a maximum temperature of approximately 1300° are employed to treat the fiber in such a process. Using such an open-ended furnace generally requires exposing a fiber having a 1% maximum relative refractive index difference for more than ten (10) hours, for example. Typically, the low temperature gradient in an open-ended furnace allows the fiber core to expand slowly. Typically, however, the relatively long heat-treated section of the fiber has relatively low mechanical strength and requires extra protection and packaging. Moreover, the first implementation of the thermally diffused expanded core technique is generally either not available or not practical in the field, where many of the fiber splices must be made, because of the large size of the required furnace and microburner systems.

The second implementation method of the thermally diffused expanded core technique typically works well when the diffusion coefficient of the core dopant in the smaller mode field diameter fiber is much greater than that of the larger mode field diameter fiber. A small mode field diameter fiber doped with erbium is a typical example. However, for fibers with a relatively large maximum relative refractive index difference and for single-mode fibers, both of which may be doped with slowly diffusing germanium, the core discontinuity cannot be completely eliminated using this method. Furthermore, when a splice is achieved with an arc fusion discharge, the resulting splice loss is typically around 0.3 dB, which can be unacceptably high since typically numerous fusion connections would be required in an optical network. Accordingly, adiabatic coupling cannot be achieved by merely heating the fused region after connection, and is typically not practical in the field.

Some fiber optic transmission systems utilize hybrid spans composed of large effective area, non-dispersion shifted fibers (NDSF) having positive dispersion over the operating window, with compensative fiber, or dispersion compensation fiber (DCF), or dispersion-slope compensation fiber (DSCF), or slope compensating fiber (SCF), having negative dispersion over the operating window. The SCF has a negative dispersion and dispersion slope across the transmission window and will therefore tend to suppress the accumulation of total dispersion and dispersion slope of the NDSF. In general the compensation ratio might be anywhere from one time (and negative) for mirror fibers to five times (and negative) for dispersion compensation fibers. NDSF with effective areas over 100 $\mu m^2$ have been reported, but the effective areas of the compensative fibers are generally much smaller—on the order of 16–35 $\mu m^2$—thereby creating a large mode field mismatch.

Since the compensative fiber is utilized as a transmission fiber, rather than as a module, the compensative fiber must be optically coupled to the NDSF with as little splice loss as possible.

SUMMARY OF THE INVENTION

In one aspect, a method of connecting optical fibers is disclosed herein. The method comprises providing a first optical fiber having a first refractive index profile, providing a second optical fiber having a second refractive index profile, determining the E-field overlap between the electric field of the first fiber and the electric field of the second fiber at a plurality of times and at one or more wavelengths for the first and second fibers, and selecting a first fusion time corresponding to a desired value of E-field overlap at one or more wavelengths. The method preferably further comprises abutting an end of the first fiber to an end of the second fiber, and heating the abutted ends of the first fiber and the second fiber at the fusion temperature for the first fusion time to form a first juncture.

The first fusion time is preferably selected to correspond to a minimum E-field overlap value for one or more wavelengths.

The first juncture preferably comprises a taper having a length of less than about 5 mm.

The heating of the abutted ends of the first fiber and the second fiber preferably comprises a tack splice.

Preferably, the method further comprises providing a third optical fiber, determining the E-field overlap between the electric field of the second fiber and the electric field of the third fiber at a plurality of times and at one or more wavelengths for the second and third fibers, and selecting a second fusion time corresponding to a desired value of E-field overlap at one or more wavelengths. The method further preferably comprises abutting an end of the third fiber to an opposite end of the second fiber from the first junction, and heating the abutted ends of the second fiber and the third fiber at the fusion temperature for the second fusion time to form a second juncture.

In a preferred embodiment, the second fusion time is selected to correspond to a minimum E-field overlap value for one or more wavelengths.

In another embodiment, the first and second fusion times are each selected to yield a minimum splice loss across the first and second junctions for one or more wavelengths.

The second juncture preferably comprises a taper having a length of less than about 5 mm.

In another aspect, a method of connecting optical fibers is disclosed herein, the method comprising: providing a first optical fiber having a first refractive index profile; providing a second optical fiber having a second refractive index profile; determining the diffused refractive index profile, at a plurality of times and at one or more wavelengths, of the first fiber being subjected to a fusion temperature; determining the diffused refractive index profile, at a plurality of times and at one or more wavelengths, of the second fiber being subjected to the fusion temperature; determining the electric field of the first fiber at a plurality of times and at one or more wavelengths based upon the diffused refractive index profile of the first fiber as a function of time; determining the electric field of the second fiber at a plurality of times and at one or more wavelengths based upon the diffused refractive index profile of the second fiber as a function of time; determining the E-field overlap between the electric field of the first fiber and the electric field of the second fiber at a plurality of times and at one or more wavelengths for the first and second fibers; and selecting a first fusion time corresponding to a desired value of E-field overlap at one or more wavelengths.

The method preferably further comprises abutting an end of the first fiber to an end of the second fiber, and heating the abutted ends of the first fiber and the second fiber at the fusion temperature for the first fusion time to form a first juncture.

The method further preferably comprises providing a third optical fiber having a third refractive index profile; determining the diffused refractive index profile, at a plurality of times and at one or more wavelengths, of the third fiber being subjected to a fusion temperature; determining the electric field of the third fiber at a plurality of times and at one or more wavelengths based upon the diffused refractive index profile of the third fiber as a function of time; determining the E-field overlap between the electric field of the second fiber and the electric field of the third fiber at a plurality of times and at one or more wavelengths for the second and third fibers; and selecting a second fusion time corresponding to a desired value of E-field overlap at one or more wavelengths.

The method also preferably comprises abutting an end of the third fiber to an opposite end of the second fiber from the first junction and heating the abutted ends of the second fiber and the third fiber at the fusion temperature for the second fusion time to form a second juncture.

In another aspect, an optical waveguide bridge fiber in combination with a first fiber and a second fiber is disclosed herein, the first fiber having a first mode field diameter and positive dispersion in an operating wavelength region between about 1500 nm and about 1650 nm and the second fiber having a second mode field diameter and negative dispersion in the operating wavelength region, wherein one end of the bridge fiber is connected to the first fiber and the other end of the bridge fiber is connected to the second fiber, wherein the bridge fiber comprises a central region extending radially outward from the centerline and having a positive relative refractive index percent, $\Delta_1$ %(r) with a maximum relative refractive index percent, $\Delta_1$, the central region containing no downdopant, and an inner annular region adjacent and surrounding the central region and having a non-negative relative refractive index percent, $\Delta_2$ %(r), with a maximum relative refractive index percent, $\Delta_2$, the inner annular region containing no downdopant, and an outer annular cladding region surrounding the inner annular region and having a relative refractive index percent, $\Delta_c$ %(r), of essentially 0%.

The bridge fiber preferably has an uncabled fiber cutoff wavelength of less than or equal to about 1500 nm for a 2 m length of bridge fiber.

The length of the bridge fiber is preferably less than or equal to about 50 m.

In a preferred embodiment, the central core region of the bridge fiber preferably has an alpha greater than 1 and less than about 15. In a second preferred embodiment, the central core region has an alpha greater than 1 and less than about 5. In a third preferred embodiment, the central core region has an alpha greater than about 5 and less than about 12.

In a preferred embodiment, the central region has a $\Delta_1$ of less than about 1.5%.

In a preferred embodiment, the inner annular region comprises a first annular core segment, adjacent and surrounding the central region and having a non-negative relative refractive index percent.

In a preferred embodiment, the first annular core segment has a positive relative refractive index percent of less than about 0.1%.

In a preferred embodiment, the inner annular region comprises a first annular core segment, adjacent and surrounding the central region and having a non-negative relative refractive index percent, and a second annular core segment, adjacent and surrounding the first annular core segment and having a positive relative refractive index percent.

In another preferred embodiment, the first annular core segment has a relative refractive index percent of essentially 0%.

In a preferred embodiment, the first annular core segment has a positive relative refractive index percent of less than about 0.1%.

In a preferred embodiment, the second annular core segment has a positive relative refractive index percent of less than about 0.4%.

In another aspect, an optical waveguide fiber span is disclosed herein comprising: a first fiber portion comprising a central core segment having a raised relative refractive index profile, a first annular core segment surrounding the central core segment and having a depressed relative refractive index profile, a second annular core segment surrounding the first annular core segment having a raised relative refractive index profile; and a second fiber portion joined to the first fiber portion at a first junction, the second fiber portion comprising a central core segment having a raised relative refractive index profile, a first annular core segment surrounding the central core segment and having a non-negative relative refractive index profile, wherein the E-field overlap at the first junction is between 0.95 and 1.00.

Preferably, the second fiber portion contains no downdopants. Even more preferably, the second fiber portion contains no fluorine.

The second fiber portion preferably further comprises a second annular core segment surrounding the first annular core segment, the second annular core segment having a raised relative refractive index profile and no downdopants.

The E-field overlap at the junction between the first and second fiber portions is preferably between 0.96 and 1.00, even more preferably between 0.98 and 1.00.

Preferably, the first fiber portion is fused to the second fiber portion.

The span further preferably comprises a third fiber portion joined to the second fiber portion at a second junction opposite the first junction, wherein the E-field overlap at the second junction is between 0.95 and 1.00.

In yet another aspect, a method of connecting optical waveguide fibers is disclosed herein, the method comprising: providing a first fiber, providing a second fiber, determining the E-field overlap between the first and second fibers as a function of splicing time, selecting a splicing time corresponding to a desired E-field overlap, and fusing the first fiber to the second fiber for the selected splicing time.

The E-field overlap between the first and second fibers before splicing is preferably greater than about 0.70, more preferably greater than about 0.90.

The E-field overlap between the first and second fibers after splicing is preferably greater than about 0.90, even more preferably greater than about 0.95, and even more preferably greater than about 0.97.

Preferably, the E-field overlap between the first and second fibers before splicing is less than 0.95 and the E-field overlap between the first and second fibers after splicing is greater than about 0.95.

In still another aspect, a method of connecting optical waveguide fibers is disclosed herein, the method comprising: providing a first fiber; providing a second fiber; providing an intermediate fiber having a first end and a second end, wherein the intermediate fiber and the first fiber have a pre-splice E-field overlap of greater than about 0.95, and wherein the intermediate fiber and the second fiber have a pre-splice E-field overlap of greater than about 0.70; fusing the first fiber to the intermediate fiber to form a first junction, wherein the intermediate fiber and the first fiber have a post-splice E-field overlap of greater than about 0.95; and fusing the second fiber to the intermediate fiber to form a second junction, wherein the intermediate fiber and the second fiber have a post-splice E-field overlap of greater than about 0.95.

Preferably, the intermediate fiber and the first fiber have a post-splice E-field overlap of greater than about 0.96.

Preferably, the intermediate fiber and the second fiber have a post-splice E-field overlap of greater than about 0.96, more preferably greater than about 0.97.

Preferably, the splice loss at the first junction is less than about 0.20 dB at 1550 nm, more preferably less than about 0.15 dB at 1550 nm.

Preferably, the splice loss at the second junction is less than about 0.20 dB at 1550 nm, more preferably less than about 0.10 dB at 1550 nm, even more preferably less than about 0.07 dB at 1550 nm.

The overall splice loss for the first and second junctions is preferably less than or equal to about 0.30 dB, more preferably less than or equal to about 0.25 dB, even more preferably less than or equal to about 0.20 dB.

In a preferred embodiment, the intermediate fiber has an uncabled fiber cutoff wavelength of less than or equal to about 1500 nm for a 2 m length of intermediate fiber and the length of the intermediate fiber is less than or equal to about 50 m. In another preferred embodiment, the intermediate fiber has an uncabled fiber cutoff wavelength of less than or equal to about 1500 nm for a length of bridge fiber greater than or equal to about 2 m.

In yet another aspect, a dispersion compensation module is disclosed herein comprising a dispersion compensation fiber, an NDSF fiber, and a bridge fiber having a first end connected to the dispersion compensation fiber and a second end connected to the NDSF, wherein the splice loss attenuation across the dispersion compensation fiber, the bridge fiber and the NDSF is less than about 0.3 dB.

In a preferred embodiment, module has pigtails comprised of the NDSF.

Preferably, none of the bridge fiber is heated after each end has been fusion spliced. Even more preferably, none of the bridge fiber is heated, after each end has been fusion spliced, to such a temperature that causes dopant diffusion in the bridge fiber.

Preferably the majority of the length of the bridge fiber is not tapered, that is, the majority of the length of the bridge fiber preferably has a uniform relative refractive index profile and uniform physical dimensions.

Preferably, the bridge fiber contains no downdopants. Preferably, the bridge fiber contains no fluorine.

Reference will now be made in detail to the present preferred embodiments of the invention, examples of which are illustrated in the accompanying drawings. Exemplary embodiment of the segmented core refractive index profile of the present invention is shown in each of the figures.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the following description together with the claims and appended drawings.

Figure 4:
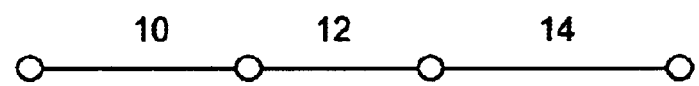
FIG. 4 illustrates an optical fiber span comprised of a dispersion compensating fiber portion, a bridge fiber portion, and a single mode NDSF fiber portion.
Figure 5:
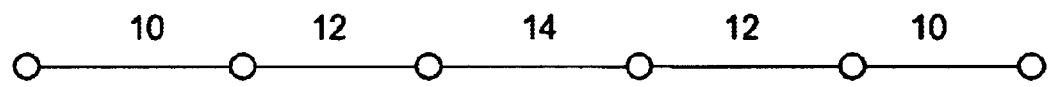
FIG. 5 illustrates an optical fiber span comprised of a first single mode NDSF fiber portion, a first bridge fiber portion, a dispersion compensating fiber portion, a second bridge fiber portion, and a second single mode NDSF fiber portion.

The increased demand for long-haul transmission fibers has prompted a need for compensative fibers such as dispersion and dispersion-slope compensative fibers which have negative dispersion and negative dispersion slope over the operating wavelength. Examples of such fibers, for example, include fibers such as those represented by the relative refractive index profiles illustrated in FIG. 1 and FIG. 2. These fibers may have index profiles formed from various dopants, wherein those represented in FIG. 1 and FIG. 2 preferably comprise both germania, and fluorine doped core regions. The fibers illustrated in FIGS. 1 and 2 exhibit four core segments, 1, 2, 3, and 4, and a cladding 5. Segments 1 and 4 are preferably Ge-doped, while core segment 2 is preferably F-doped. Segment 2 is typically referred to as a "moat" region. Cladding segment 5 is preferably (undoped) silica. In at least one preferred arrangement, either of the compensative fibers is connected to a positive dispersion fiber, such as a non-dispersion-shifted fiber ("NDSF") or such as a step index single mode fiber represented in FIG. 3, or other positive dispersion fiber. FIG. 4 illustrates one possible span or concatenated link comprising a fiber 10 exhibiting positive dispersion at the operating wavelength, a bridge fiber 12, and a fiber 14 exhibiting negative dispersion at the operating wavelength, as disclosed herein. FIG. 5 illustrates another possible span or concatenated link comprising a first positive dispersion fiber 10, a bridge fiber 12, a negative dispersion fiber 14, a second bridge fiber 12, and a second positive dispersion fiber 10 as disclosed herein.

As used herein, the terms "transmissive fiber" or "transmission fiber" refers to a length of fiber used in a span of a telecommunications system regardless of its dispersive characteristics. Thus, for example, a positive dispersion NDSF fiber connected to a negative dispersion fiber or slope compensation fiber may form a transmission span or transmission link comprised of two or more transmissive fibers.

The "refractive index profile" is the relationship between refractive index or relative refractive index and waveguide fiber radius.

"Total dispersion", sometimes called "chromatic dispersion", of a waveguide fiber is the sum of the material dispersion, the waveguide dispersion, and the inter-modal dispersion. In the case of single mode waveguide fibers the inter-modal dispersion is zero. Total dispersion is said to be positive if shorter wavelength signals travel faster than longer wavelength signals in the waveguide. Conversely, in a negative total dispersion waveguide, signals of longer wavelength travel faster.

"Effective area" is defined as:

$$A_{\it eff}=2\pi(\int E^2\ r\ dr)^2/(\int E^4\ r\ dr),$$

where the integration limits are 0 to $\infty$, and E is the electric field associated with light propagated in the waveguide.

The "relative refractive index percent" is defined as $\Delta\% = 100\times(n_i^2-n_c^2)/2n_i^2$, where $n_i$ is the maximum refractive index in region i, unless otherwise specified, and $n_c$ is the average refractive index of the cladding region. In cases where the refractive index of an annular region or a segment is less than the average refractive index of the cladding region, the relative index percent is negative and is referred to as having a depressed region or depressed index, and is calculated at the point at which the relative index is most negative unless otherwise specified. In cases where the refractive index of an annular region or a segment is greater than the average refractive index of the cladding region, the relative index percent is positive and the region can be said to be raised or to have a positive index.

As used herein a "downdopant" is defined to be either fluorine or boron.

The term "α-profile" refers to a refractive index profile, expressed in terms of $\Delta(r)\%$, where r is radius, which follows the equation, $$\Delta(r)\%=\Delta(r_o)(1-[|r-r_o|/(r_1-r_o)]^\alpha),$$

where $r_o$ is the point at which $\Delta(r)\%$ is maximum, $r_1$ is the point at which $\Delta(r)\%$ is zero, and r is in the range $r_i \leq r \leq r_f$, where delta is defined above, $r_i$ is the initial point of the α-profile, $r_f$ is the final point of the α-profile, and α is an exponent which is a real number.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical switches, optical filters, or multiplexing or demultiplexing devices. One may denote a group of inter-connected links as a telecommunications system.

In one exemplary embodiment, a proposed slope compensated system comprises an NDSF fiber (or fiber portion) and a compensative fiber, such as a slope compensative fiber, or fiber portion, having mode field diameters of 11 μm and 6 μm, respectively. Such a large mode field mismatch can produce very high losses if the fibers were to be directly spliced to each other using standard techniques. These two factors alone can combine to produce splice losses on the order of 0.6–0.7 dB when the NDSF fiber is directly spliced to the compensative fiber. Splice loss herein is reported in dB unless otherwise noted.

Such splice losses between fibers can be minimized by matching mode field diameters and by minimizing taper loss and geometric offsets, including core misalignment and tilt. In the case of the positive dispersion fiber to compensative fiber connection, the largest source of splice loss is typically due to mode field diameter mismatch. The positive dispersion fiber typically has a significantly larger mode field diameter than that of the compensative fiber. Some fiber combinations with mode field diameter mismatches might possibly be spliced with relatively little loss by extending the heating time within the splicer to increase the mode field diameter of the smaller core fiber by diffusion of the germania. However, the use of a fluorine-doped moat region in the core inhibits the diffusion of the germania proximate the region to be connected or spliced, thereby preventing adequate growth of the mode field diameter. In addition, the fluorine diffuses faster than germania, and the fluorine migrates into both the inner and outer core regions, reducing the guiding ability of the waveguide and causing subsequent high splice loss. Consequently, for example, if a first fiber having a relatively large MFD and no fluorine were to be spliced to a second fiber having a relatively small MFD but containing fluorine, the fluorine would diffuse relatively quickly and limit the amount of mode field expansion that can occur in the smaller MFD fiber, so that an acceptable match in mode field diameter between the two fibers is impeded.

As disclosed herein, a bridge fiber, or connecting fiber, or transition fiber, or intermediate fiber, or jumper fiber, can be used to connect two dissimilar fibers such as the aforementioned exemplary NDSF and the SCF span, wherein the bridge fiber has an intermediate MFD to provide a bridge between the two dissimilar fibers. For example, we have found that using a non-zero dispersion shifted fiber (NZDSF) with a MFD of 8 μm as the bridge fiber can reduce the power losses when connecting a step index single mode fiber with a 11 μm MFD and a dispersion compensating fiber with a 6 μm MFD, as discussed in the above example, by about 0.2 dB compared to a direct splice. However, we have also found that the splice losses on both ends of the bridge fiber can be relatively high due to the mode field mismatch and electric field or "E-field" mismatch.

According to preferred embodiments disclosed herein, an optical fiber is utilized that can "bridge" the mode field diameter gap between the transmission fiber and the compensative fiber to achieve low splice loss. The bridge fiber preferably matches the mode field size and/or matches the E-field of the compensative fiber while also allowing for E-field matching and/or for mode field expansion to match the mode field diameter of the positive dispersion fiber. Various embodiments as disclosed herein may be used to connect various combinations of various types of fibers including, but not limited to, positive dispersion fibers (those that exhibit a positive dispersion at the operating wavelength) and compensative fibers (those that exhibit a negative dispersion at the operating wavelength). However, for purposes of illustration, discussion will be hereafter largely focused upon the combination of a positive dispersion fiber such as that represented in FIG. 3 and a compensative (i.e. dispersion and/or dispersion-slope compensative) fiber such as that represented in FIG. 1 or FIG. 2.

According to a preferred embodiment disclosed herein, a first optical fiber having a first refractive index profile optical fiber may be connected to a second optical fiber having a second refractive index profile by determining the diffused refractive index profile, at a plurality of times and at one or more wavelengths, of the first fiber as the first fiber is subjected to a fusion temperature, and by determining the diffused refractive index profile, at a plurality of times and at one or more wavelengths, of the second fiber as the second fiber is subjected to the fusion temperature. The diffused refractive index profiles may be determined by modeling the refractive characteristics of a respective fiber by, for example, a finite difference solution of the diffusion equation, or by measured results.

For example, as discussed in "Numerical Analysis of Eigenmodes and Splice Losses of Thermally Diffused Expanded Core Fibers", Ohtera et al., J. Lightwave Technology, volume 17, number 12, December 1999, p. 2676 et seq., for a step index single mode fiber, the refractive index profile n(r) is proportional to the distribution function of the dopant and is expressed as follows:

$$n^2(r) = n_0^2 + (n_1^2 - n_0^2) u(r,t)$$

where $n_0$ and $n_i$ are the refractive indexes of the cladding and the core of the step index single mode fiber before thermal diffusion, respectively. The distribution u(r,t) is the distribution of the dopant as a function of radial position r and heating time t. Germanium dioxide, or germania ($GeO_2$), is typically used as a dopant in step index single mode fibers. The normalized frequency "v" of the fiber with such index profile can be defined as:

$$v^2 = k_0^2 (n_1^2 - n_0^2) \int \{n^2(r)n_0^2\} 2r\, dr, \text{ from 0 to } +\infty$$

wherein the above equation is expressed by using the aforementioned equation for refractive index profile as follows:

$$v^2 = k_0^2(n_1^2 - n_0^2) \int u(r,t) \, 2r \, dr, \text{ from 0 to } +\infty$$

Diffusion of the dopant can then be simulated by solving the following equation:

$$\Delta^2 u(r,t) = 1/C \, \partial u(r,t)/\partial t$$

where C is a diffusion coefficient of the dopant. The dopant distribution u(r,t) after sufficient diffusion becomes a Gaussian function and the refractive index profile n(r) also becomes a Gaussian function:

$$n^2(r) = n_0^2 + (a^2/A^2)(n_1^2 - n_0^2) \exp(-r^2/A^2)$$

where a is the core radius before diffusion and A corresponds to the core radius after diffusion and is expressed as $$A = 2(Ct)^{1/2}$$

The electric field of the first fiber may then be determined for a plurality of times and at one or more wavelengths based upon the diffused refractive index profile of the first fiber as a function of time. Likewise, the electric field of the second fiber may be determined for a plurality of times and at one or more wavelengths based upon the diffused refractive index profile of the second fiber as a function of time. Then, the E-field overlap between the electric field of the first fiber and the electric field of the second fiber can be calculated at a plurality of times and at one or more wavelengths for the first and second fibers from the following equation:

$$I = \frac{\int_0^\infty E_1 E_2^* R dR \int_0^\infty E_2 E_1^* R dR}{\int_0^\infty |E_1|^2 R dR \int_0^\infty |E_2|^2 R dR}$$

where E1 and E1* are the E-field and complex conjugated field for fiber 1, E2 and E2* the same for fiber 2.

The splice loss for the junction may then be measured or calculated from the following equation:

$$\delta = -10 \log(1).$$

A plot of E-field overlap versus time, i.e. fusion time, for a given wavelength may exhibit a minimum at a particular time, or for a range of times.

A first fusion time is then selected. The first fusion time may be selected to correspond to a desired splice loss at one or more wavelengths, a minimum E-field overlap value for one or more wavelengths, or a desired value of E-field overlap at one or more wavelengths, where, for example, the desired value of fusion time corresponds to a splice loss at or below a first splice loss threshold. According to a preferred embodiment as disclosed herein, a first optical fiber is connected to a second optical fiber by a tack splice which is effected by arcing of a fusion splicer for a duration of greater than about 0.5 seconds and less than about 3 seconds, more preferably greater than about 0.5 seconds and less that about 2 seconds. The first fusion time is sufficient to physically connect the first and second fibers.

In a preferred embodiment, the first fusion time is selected to flatten the splice loss in a particular wavelength range. That is, the sum of the differences in the E-field overlaps, and consequently the splice loss, at a plurality of wavelengths are minimized. The selection of fusion time which results in an improvement of flatness of E-field overlap, or splice loss, across a wavelength region may be made at the expense of achieving a minimum E-field overlap, or splice loss, at one or more particular wavelengths in the wavelength region.

For example, if the splice loss at a particular junction reaches a minimum of 0.18 dB at a wavelength of 1550 nm after 1 second of splicing at a fusion temperature, but the splice loss at the same junction exhibits 0.24 dB at a wavelength of 1535 nm and 0.26 dB at a wavelength of 1565 nm, each after 1 second of splicing, then a different fusion time may be selected, for example 1.3 seconds, which does not result in the minimum of 0.18 dB at 1550 nm, but, for example, results in splice losses of 0.21 dB, 0.20 dB, and 0.22 dB at 1535, 1550, and 1565 nm, respectively, thereby improving the flatness of the splice loss response across the wavelength range of 1535 to 1565 nm. The splice losses attained by the 1.3 second fusion time could also satisfy, for example, a maximum splice loss threshold of 0.23 dB for that particular junction which would not be met by the 1 second fusion time.

In another preferred embodiment, a first fusion time is selected to correspond to the fusion time that would result in a minimum E-field overlap for a particular wavelength.

After the first fusion time has been selected according to a desired criterion, the respective ends of the two fibers are physically moved together into abutment such that an end of the first fiber abuts an end of the second fiber. The abutted ends of the first fiber and the second fiber are then heated at the fusion temperature for the first fusion time to form a first junction.

In a preferred embodiment, no further heating is applied to the junction. Preferably, the junction is not annealed.

According to a preferred embodiment disclosed herein, the second fiber may then be connected to a third optical fiber having a third refractive index profile. Similar to the method outlined above for the first and second fibers, the diffused refractive index profile of the third fiber is determined at a plurality of times and at one or more wavelengths as the fiber is being subjected to a fusion temperature. Then, the electric field of the third fiber is determined at a plurality of times and at one or more wavelengths based upon the diffused refractive index profile of the third fiber as a function of time. The E-field overlap between the electric field of the second fiber and the electric field of the third fiber at a plurality of times and at one or more wavelengths may then be determined for the second and third fibers.

A second fusion time is then selected. The second fusion time may be selected which corresponds to a desired splice loss at one or more wavelengths, or a minimum E-field overlap value for one or more wavelengths, or a desired value of E-field overlap at one or more wavelengths, the desired value corresponding to a splice loss at or below a second splice loss threshold.

In another preferred embodiment, a second fusion time is selected to correspond to the fusion time that would result in a minimum E-field overlap for a particular wavelength.

After the second fusion time has been selected according to a desired criterion, the respective ends of the two fibers are physically moved together into abutment such that an end of the third fiber abuts an end of the second fiber opposite the end forming the first junction between the first and second fibers. The abutted ends of the second fiber and the third fiber are then heated at the fusion temperature for the second fusion time to form a second junction.

In a preferred embodiment, no further heating is applied to the junction. Preferably, the junction is not annealed.

Generally, the core of fiber comprises one or more segments which may be doped. The segments are physically identifiable portions of the core. At the same time, it should be understood that, optically speaking, the core is where about 99% of the propagated light travels, wherein a portion of the propagated light could travel outside a physical core segment.

Figure 6:
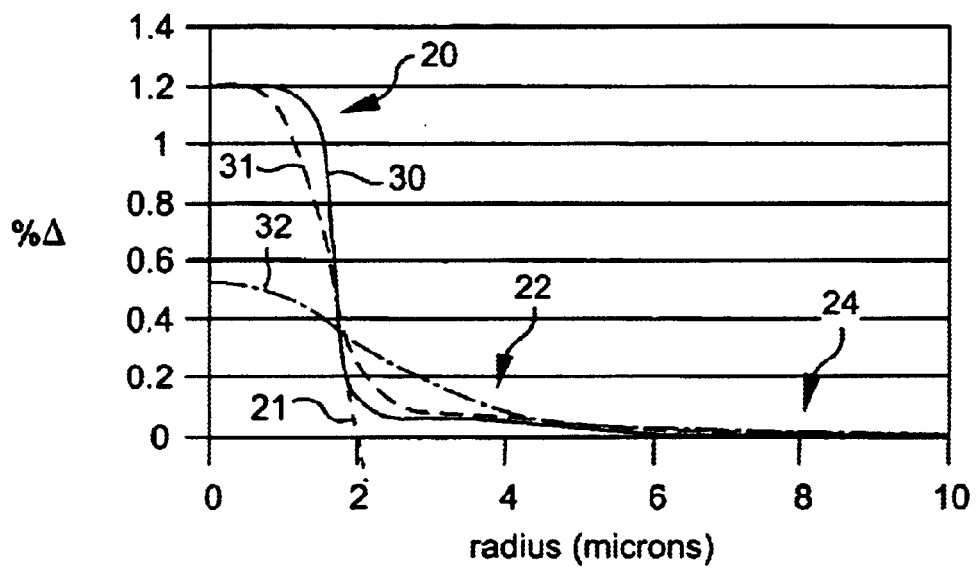
FIG. 6 shows a graphical representation of the refractive index profiles for a first preferred embodiment of a bridge fiber as disclosed herein, before splicing and after 1.1 and 20 seconds of fusion splice time.

In a first preferred embodiment, the bridge fiber disclosed herein preferably comprises central core region comprised of center core segment 20, an inner annular region comprised of first annular segment 22 adjacent and surrounding the central core region, and an outer annular cladding region 24 adjacent and surrounding the first annular region, as illustrated in FIG. 6. Thus, the bridge fiber disclosed herein preferably comprises two core segments: center core segment 20 and first annular core segment 22. Center core segment 20 comprises a maximum relative refractive index or peak $\Delta$ or $\Delta_1\%$ between 0.8 and 1.6, more preferably between 1.0 and 1.4, and a half-peak height radius of between about 1.4 and 2.5 microns, more preferably between about 1.6 and 2.3 microns. The first annular core segment 22, which may be referred to as a "pedestal" in this case, comprises a peak $\Delta$ or $\Delta_2$ % greater than 0 and less than 0.3%, more preferably greater than 0 and less than 0.2%, and extends from a radius of about 1.5 microns to about 4 microns, more preferably from a radius of about 1.5 microns to about 3 microns, to a radius of about 10 microns, more preferably to a radius of about 9 microns.

EXAMPLE 1

Referring to FIG. 6, curve 30 corresponds to the pre-splicing relative refractive index of the bridge fiber. The central core segment 20 has a $\Delta_1$ % of about 1.2% with a generally rounded trapezoidal shape. Central core segment 20 has a half-peak height radius of about 1.7 microns. The end of central core segment 20 and the beginning of first annular core segment 22 in FIG. 6 is defined herein to start at a radius where a straight line approximation, indicated by line 21 which passes tangentially through the half-peak height, in this case 0.6%, is extrapolated to intersect with the $\Delta$ %=0 axis, shown in FIG. 6 to intersect at about 2 microns. The first annular core segment 22, or pedestal, is preferably tapered as shown in FIG. 6 with a negative slope, but may have a substantially constant or flat profile with a very small or zero slope, ending in a step or rounded shape rather than a taper. The pedestal extends to a radius of about $7\mu$ where the relative refractive index is essentially 0%, wherein the outer annular cladding region 24 commences. The outer annular cladding region 24 preferably consists of pure silica.

Figure 1:
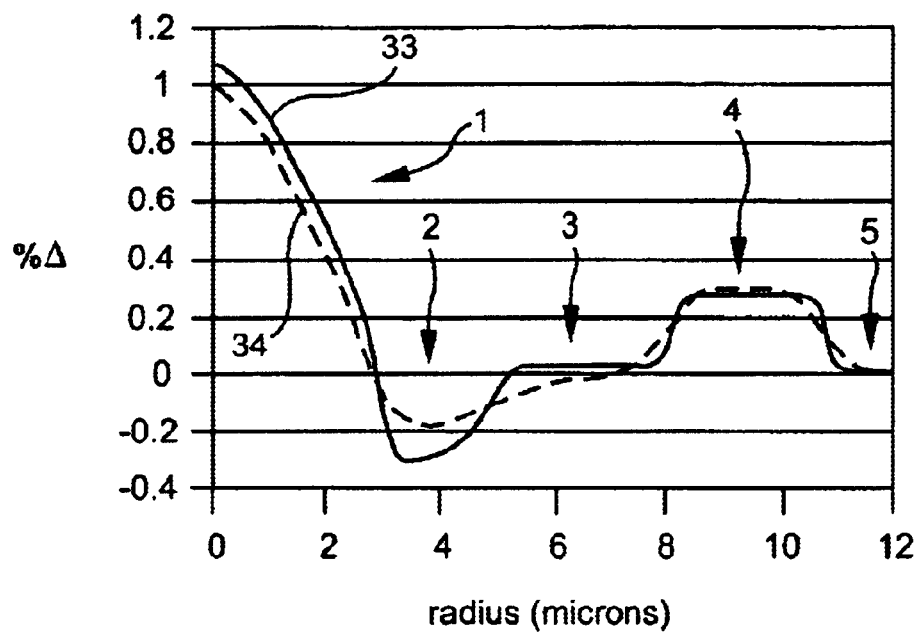
FIG. 1 shows a graphical representation of the refractive index profiles for a first exemplary dispersion compensation fiber, before splicing and after 1.1 seconds of splice time.

In FIG. 6, curves 31 and 32 correspond to the relative refractive index of the bridge fiber after 1.1 seconds and 20 seconds of fusion splicing, respectively. FIG. 1 shows two curves, 33 and 34, representing the refractive index profile of the dispersion compensation fiber at or near the splice region before splicing and after 1.1 seconds of fusion splicing, respectively.

One end of the bridge fiber of FIG. 6 was fusion spliced to the dispersion compensation fiber represented by FIG. 1 for 1.1 seconds with a Fuji 30S splicer.

Figure 7:
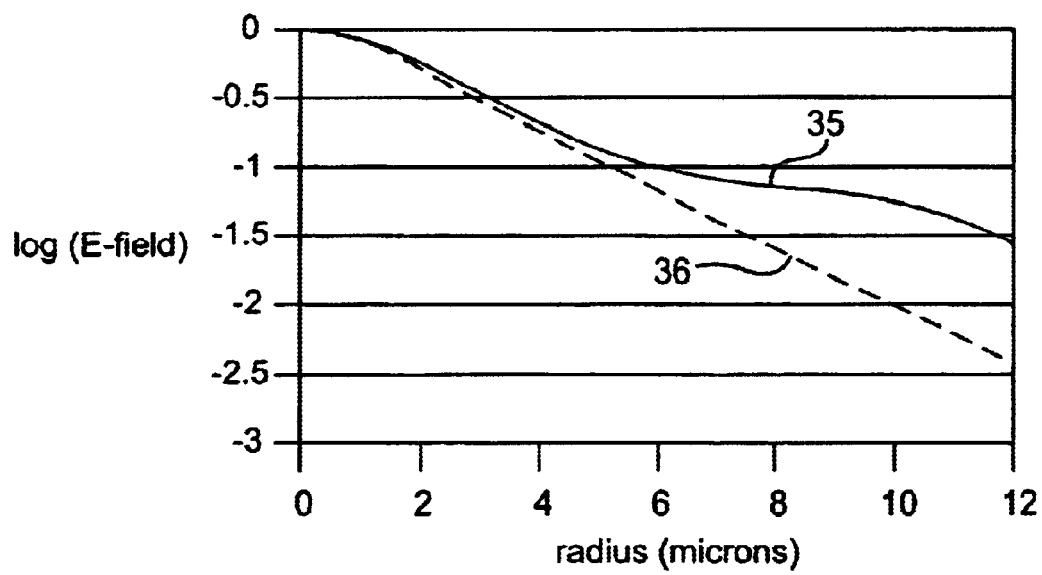
FIG. 7 shows a graphical representation of the magnitudes of the E-fields for the first preferred embodiment of a bridge fiber, illustrated in FIG. 6, and a step index single mode fiber, illustrated in FIG. 3, prior to being spliced together as disclosed herein.

FIG. 7 shows the magnitude of the E-field versus radius of the dispersion compensating fiber of FIG. 1 and the bridge fiber of FIG. 6, each prior to splicing, in curves 35 and 36, respectively, as calculated from far field measurements. The E-fields of the dispersion compensation fiber of FIG. 1 and the bridge fiber of FIG. 6, before splicing, show good overlap in FIG. 7 from the centerline at r=0 up until about 5 microns. The value of the E-field overlap integral for these two fibers, before splicing, was calculated to be 0.98, indicating a high degree of E-field matching.

Figure 8:
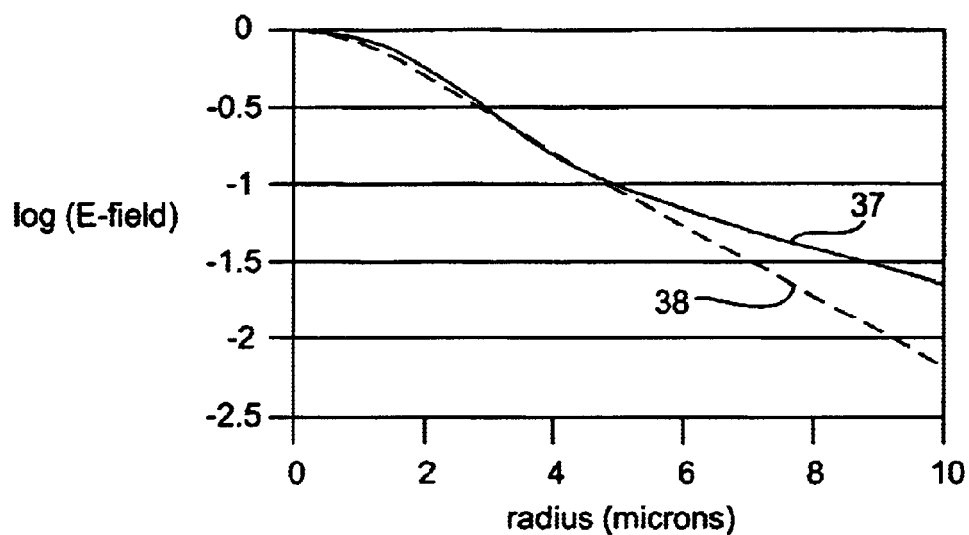
FIG. 8 shows a graphical representation of the magnitudes of the E-fields for the first preferred embodiment of a bridge fiber, illustrated in FIG. 6, and a first dispersion compensation fiber, illustrated in FIG. 1, prior to being spliced together as disclosed herein.

FIG. 8 shows the magnitude of the E-field versus radius of the dispersion compensating fiber of FIG. 1 and the bridge fiber of FIG. 6, each after 1.1 seconds of fusion splicing, in curves 37 and 38, respectively. The value of the E-field overlap integral for the curves shown in FIG. 8 was calculated to be 0.96, indicating a high degree of E-field matching after fusion (i.e. by tack splice) at the first junction.

Figure 3:
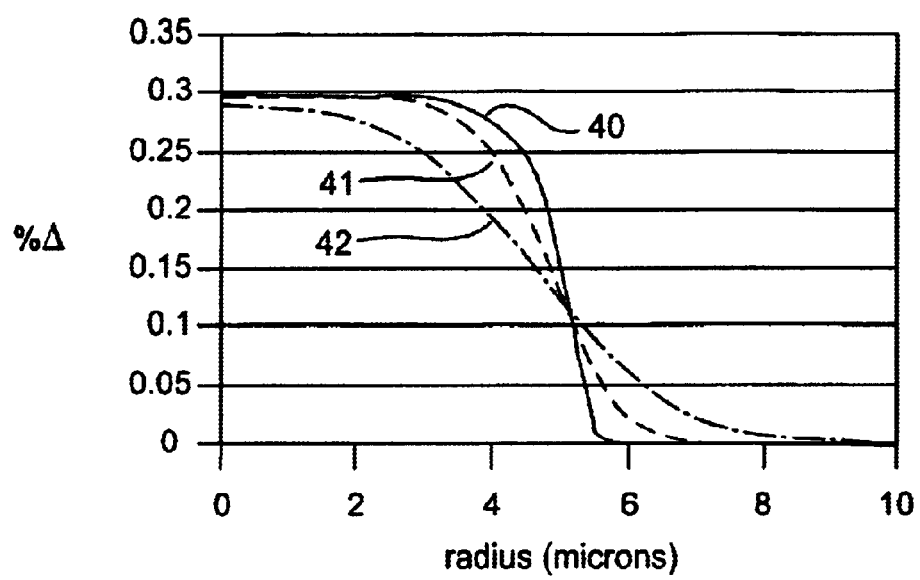
FIG. 3 shows a graphical representation of the refractive index profiles for an exemplary step index single mode fiber, before splicing and after 4 and 20 seconds of splice time.

The other end of the bridge fiber of FIG. 6 was fusion spliced to a positive dispersion fiber, more particularly an NDSF, and even more particularly a step index single mode fiber represented by FIG. 3, for 20 seconds with an Ericsson 995 splicer. In FIG. 3, curves 40, 41, and 42 show the refractive index profile of the NDSF at or near the splice region before splicing, after 4 seconds of fusion splicing, and after 20 seconds of fusion splicing, respectively.

Figure 9:
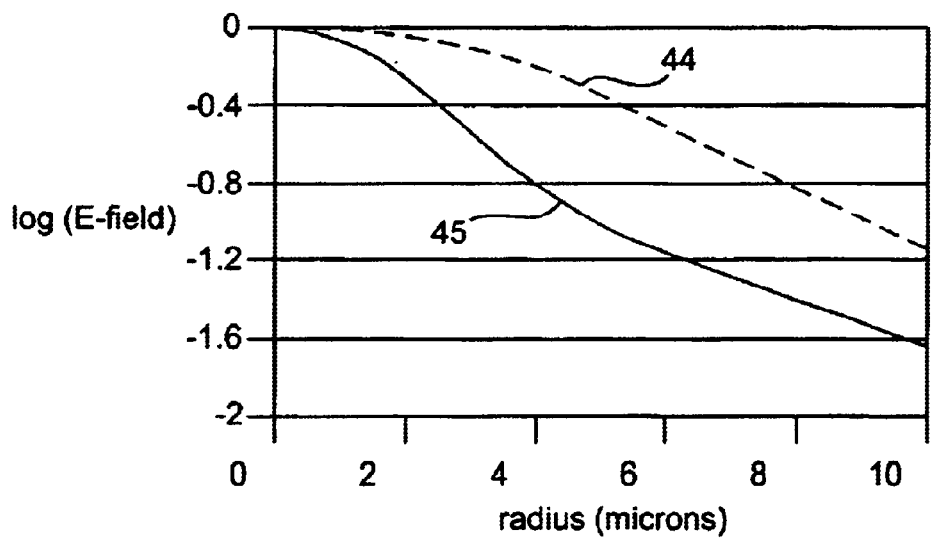
FIG. 9 shows a graphical representation of the magnitudes of the E-fields for the first preferred embodiment of a bridge fiber, illustrated in FIG. 6, and the first dispersion compensation fiber, illustrated in FIG. 1, after 1.1 seconds of fusion splicing.

FIG. 9 shows the magnitude of the E-field versus radius of the NDSF of FIG. 3 in curve 44 and the bridge fiber of FIG. 6 in curve 45. The shapes of the E-fields of the NDSF and the bridge fiber in curves 44 and 45 do not match well before splicing. The E-field overlap for these two fibers before splicing, illustrated by curves 44 and 45 in FIG. 9, was calculated to be 0.75, indicating a high degree of mismatching of the E-field.

Figure 10:
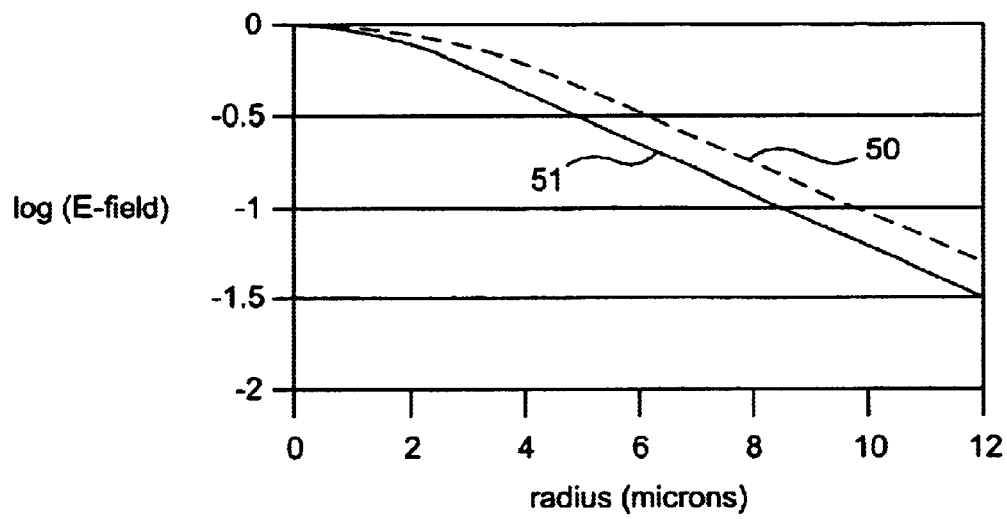
FIG. 10 shows a graphical representation of the magnitudes of the E-fields for the first preferred embodiment of a bridge fiber, illustrated in FIG. 6, and the step index single mode fiber, illustrated in FIG. 3, after 20 seconds of fusion splicing.

FIG. 10 shows the magnitude of the E-field versus radius of the NDSF fiber of FIG. 3, in curve 50, and the bridge fiber of FIG. 6, in curve 51, both after fusion splicing for 20 seconds, wherein the shapes of the E-field curves 50 and 51 match well but have a vertical offset due to the mode field mismatch, as reflected in the modeled results in Table 1. The E-field overlap for these two fibers after splicing was calculated to be 0.98, indicating a high degree of E-field matching.

Table 1 shows the modeled results for mode field diameter at 1550 nm.

TABLE 1

| Fiber | Splice Time (sec) | MFD (microns) | Cutoff (nm) |
| --- | --- | --- | --- |
| Dispersion compensating fiber (FIG. 1) | 0 | 6.3 | |
| Dispersion compensating fiber (FIG. 1) | 1.1 | 7.0 | |
| Bridge Fiber (FIG. 6) | 0 | 5.8 | 1080 |
| Bridge Fiber (FIG. 6) | 1.1 | 6.2 | 1069 |
| Bridge Fiber (FIG. 6) | 20 | 10.3 | 1117 |
| Step index single mode (FIG. 3) | 0 | 11.4 | |
| Step index single mode (FIG. 3) | 20 | 12.3 | |

The MFD at the end of the dispersion compensating fiber of FIG. 1 grew from 6.3 microns to 7.0 microns, while the MFD at the end of the bridge fiber of FIG. 6 which was fusion spliced to the dispersion compensating fiber of FIG. 1 grew from 5.8 microns to 6.2 microns. The MFD at the end of the step index single mode fiber of FIG. 3 grew from 11.4 microns to 12.3 microns, while the MFD of the end of the bridge fiber of FIG. 6 which was fusion spliced to the step index single mode fiber of FIG. 3 grew from 5.8 microns to 10.3 microns. The majority of the length of the bridge fiber, which was unaffected by the fusion splicing at either end, remained at an MFD of 5.8 microns Table 2 shows the measured results for splice loss at several wavelengths for the span comprised of dispersion compensating fiber of FIG. 1 which was fusion spliced to the bridge fiber of FIG. 6 at a first junction ("Splice A"), and wherein the other end of the bridge fiber was fusion spliced to the NDSF of FIG. 3 at a second junction ("Splice B"). The overall loss was calculated to be 0.181 dB at 1550 nm.

TABLE 2

| Wavelength | 1520 nm | 1550 nm | 1610 nm |
|---|---|---|---|
| Splice A | 0.076 | 0.084 | 0.130 |
| Splice B | 0.087 | 0.097 | 0.089 |
| Total | 0.163 | 0.181 | 0.219 |

Splice A = Dispersion compensation fiber of FIG. 1 and bridge fiber of FIG. 6
Splice B = Bridge fiber of FIG. 6 and NDSF of FIG. 3

Thus, a low overall loss was achieved by a high degree of E-field matching, as evidenced by post-splice E-field overlap values of 0.96 at the first junction (Splice A) and of 0.98 at the second junction (Splice B), even though a mode field diameter mismatch persisted at the first junction, where the post-splice MFD of the dispersion compensating fiber was 7.0 microns and the post-splice MFD of the bridge fiber of FIG. 6 at that end was 6.2 microns, and even though an even larger mode field diameter mismatch persisted at the second junction, where the post-splice MFD of the bridge fiber of FIG. 6 at that end was 10.3 microns, and the post-splice MFD of the NDSF was 12.3 microns. The absolute value of the maximum difference between the overall splice losses between 1520 and 1610 nm was less than or equal to about 0.06 dB.

We have further found that incorporation of a ring into the profile of the fiber disclosed herein can improve the coupling between the electric fields of the bridge and some compensating fibers.

As further discussed below, the ring height can be adjusted as needed to increase or decrease the mode field diameter, to increase the E-field overlap between the bridge fiber and the compensative fiber, or to otherwise improve the coupling between the two fibers, and/or obtain one or more desirable optical characteristics of the fiber, such as cut-off wavelength.

Inclusion of a ring in the profile of a bridge fiber as disclosed herein not only can improve matching between the electric fields of the bridge and compensating fibers, but can significantly improve the splice loss between the other end of the bridge fiber and an NDSF, which we believe, without needing to rely upon any particular belief, to be due to a relatively high germania content in the bridge fiber and in particular the addition of a pedestal or relatively small ring of germania contributes to the promotion of a smoother mode field expansion at the NDSF end. We have found that the combined total splice loss of less than or equal to about 0.3 dB can be achieved with fibers disclosed herein having appropriate rings when connecting compensative fibers and NDSF or other positive dispersion fibers.

Higher amounts of Ge outside the central core region, and more particularly, higher amounts of Ge in the ring, and/or locating the ring farther away from the central core region, results in higher cutoff wavelengths. In other words, the lesser the amount of Ge in the ring, or the closer the ring is to the central core region, the lower the cutoff wavelength, wherein higher order modes tend to radiate into the outer cladding. Lower cutoff wavelengths tend to ensure that the bridge fiber is single-moded, in particular at operating wavelengths. Thus, lower cutoff wavelengths enable more of the propagating energy to be channeled into the fundamental mode, as opposed to being coupled with higher order modes.

Thus, ring size and/or ring position are closely connected to the cutoff wavelength (i.e. 2 m cutoff, or 5 m cutoff, etc.).

In general, the larger the ring or the farther out the ring lies, the higher the cutoff. Although a larger ring is useful in matching the optical field of a fiber to be connected, such as the compensative fiber represented in FIG. 2, the size and location of the ring would typically be limited by the cutoff restriction for a desired operating wavelength or wavelength range of a given application. In addition, relatively large rings produce non-Gaussian E-fields which may increase the E-field mismatch and splice loss to positive dispersion fiber or NDSF, such as step index single mode fiber.

Figure 11:
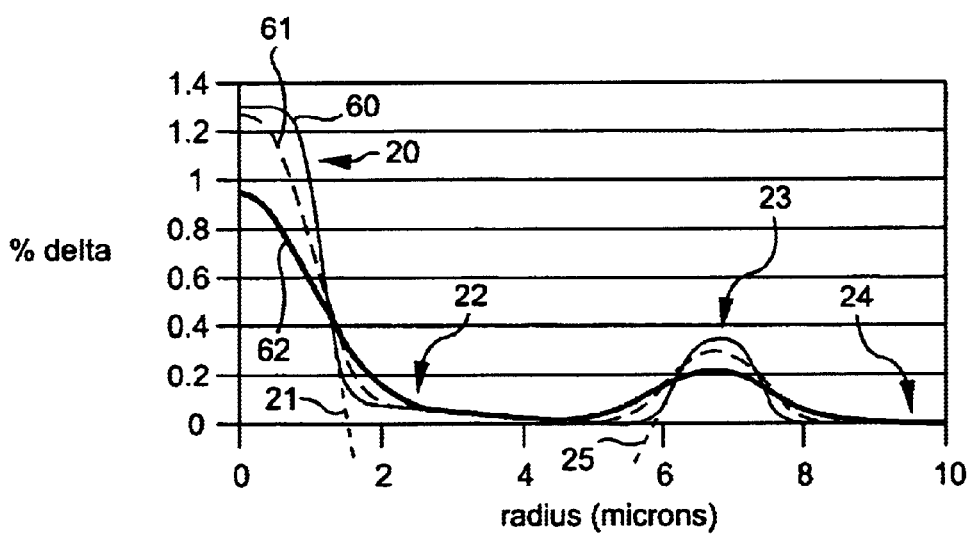
FIG. 11 shows a graphical representation of the refractive index profiles for a second preferred embodiment of a bridge fiber as disclosed herein, before splicing and after 0.7 and 4 seconds of fusion splice time.

Referring to FIG. 11, in a second preferred embodiment the fiber disclosed herein preferably comprises: central core region comprised of a central core segment 20; an inner annular region comprised of first annular core segment 22 adjacent and surrounding the central core segment 20, and second annular core segment 23 adjacent and surrounding the first annular core segment 22; and an outer annular cladding region 24 adjacent and surrounding the second annular core segment 23. Thus, the bridge fiber disclosed herein preferably comprises three core segments: center core segment 20, first annular core segment 22, and second annular core segment 23. Center core segment 20 comprises a maximum relative refractive index or peak $\alpha$ or $\Delta_1$ % between 0.8 and 1.6, more preferably between 1.0 and 1.4, and a half-peak height radius of between about 0.8 and 2 microns, more preferably between about 0.9 and 1.5 microns. The first annular core segment 22, which may be referred to as a "pedestal" in this case, comprises a peak $\Delta$ or $\Delta_2$% greater than 0 and less than 0.3%, more preferably greater than 0 and less than 0.2%, and begins at a radius of between about 1.0 microns and about 3.5 microns, more preferably at a radius of between about 1.5 microns and about 3 microns, as defined by a straight line approximation wherein a straight line passes tangentially through the half-peak height of the central core segment 20 and is extrapolated to intersect with the $\Delta$ %=0 axis, as further discussed in Example 2 below.

The end of first annular core segment 22 and the beginning of second annular core segment 23 is defined herein to occur at a radius where a straight line approximation passes tangentially through the half-peak height of the centermost side of second annular core segment 23 and is extrapolated to intersect with the $\Delta$ %=0 axis. First annular core segment 22 ends and second annular core segment 23 begins between about 4 microns and about 7 microns, more preferably between about 4.5 microns and about 6.5 microns. Second annular core segment 23 has a peak $\Delta$ % or $\Delta_3$ % of between about 0.1% and 0.5%, more preferably between about 0.15% and 0.4%. Second annular core segment 23 ends where the $\Delta$ % falls to essentially 0%. The outer annular cladding region or cladding segment 24 is disposed adjacent and surrounding second annular core segment 23, and preferably begins from a radius of about 7 microns, more preferably from about 8 microns.

EXAMPLE 2

Referring to FIG. 11, curve 60 corresponds to the pre-splicing relative refractive index of the bridge fiber disclosed herein. The central core segment 20 has a $\Delta_1$% of about 1.3% with a generally rounded trapezoidal or rounded step shape. Central core segment 20 has a half-peak height radius of about 1.2 microns. The end of central core segment 20 and the beginning of first annular core segment 22 in FIG. 11 is defined herein to start at a radius where a straight line approximation, indicated by line 21 which passes tangentially through the half-peak height of central core segment 20, in this case 0.65%, is extrapolated to intersect with the Δ %=0 axis, shown in FIG. 11 to intersect at about 1.5 microns. The first annular core segment 22, or pedestal, is preferably tapered as shown in FIG. 11 with a negative slope, but may have a substantially constant or flat profile with a very small or zero slope. Second annular core segment 23 has a peak Δ % or $\Delta_3$ % of about 0.35%. The pedestal extends to a radius of about 5 microns where the straight line approximation indicated by line 25 in FIG. 11 which passes tangentially through the half-peak height, in this case about 0.18% and which is extrapolated to intersect with the Δ %=0 axis. Second annular core segment 25 extends to a radius of about 7.8 microns where the relative refractive index is essentially 0%, wherein the outer annular cladding region 24 commences. The outer annular cladding region 24 preferably consists of pure silica.

Figure 2:
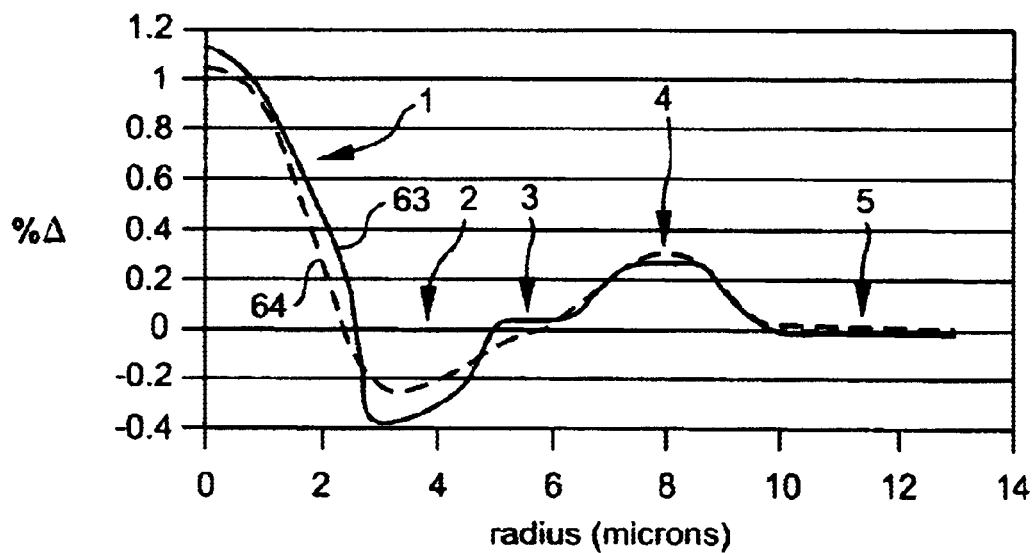
FIG. 2 shows a graphical representation of the refractive index profiles for a second exemplary dispersion compensation fiber, before splicing and after 0.7 seconds of splice time.

In FIG. 11, curves 61 and 62 correspond to the relative refractive index of the bridge fiber after 0.7 seconds and 4 seconds of fusion splicing, respectively, as calculated by solution of the diffusion equation. FIG. 2 shows two curves, 63 and 64, representing the refractive index profile of the dispersion compensation fiber at or near the splice region before splicing and after 0.7 seconds of fusion splicing, respectively, as calculated by solution of the diffusion equation.

One end of the bridge fiber of FIG. 11 was modeled as being fusion spliced to the dispersion compensating fiber of FIG. 2 for 0.7 seconds with a Fuji 30S splicer.

Figure 12:
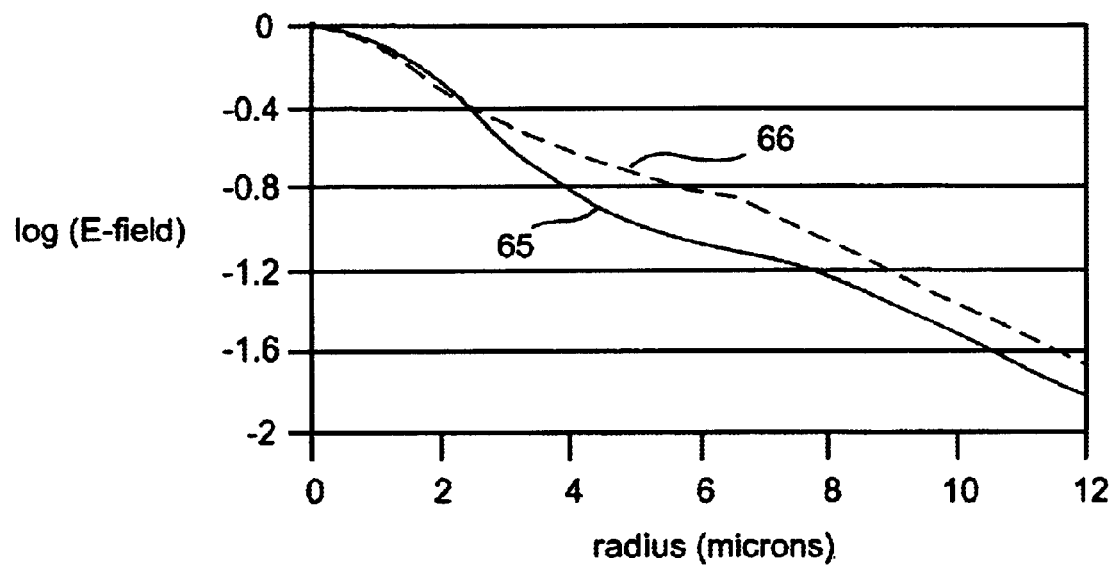
FIG. 12 shows a graphical representation of the magnitudes of the E-fields for the second preferred embodiment of a bridge fiber, illustrated in FIG. 11, and a second dispersion compensation fiber, illustrated in FIG. 2, prior to being spliced together as disclosed herein.

FIG. 12 shows the calculated magnitude of the E-field versus radius of the dispersion compensating fiber of FIG. 2 and the bridge fiber of FIG. 11, each prior to splicing, in curves 65 and 66, respectively. The E-fields of the dispersion compensation fiber of FIG. 2 and the bridge fiber of FIG. 11, before splicing, show good overlap in FIG. 12 from the centerline at r=0 up until about 2 microns and good matching in shape but separated by a gap for radii greater than 2 microns. The value of the E-field overlap integral for these two fibers, before splicing, was calculated to be 0.95, indicating a high degree of E-field matching.

Figure 13:
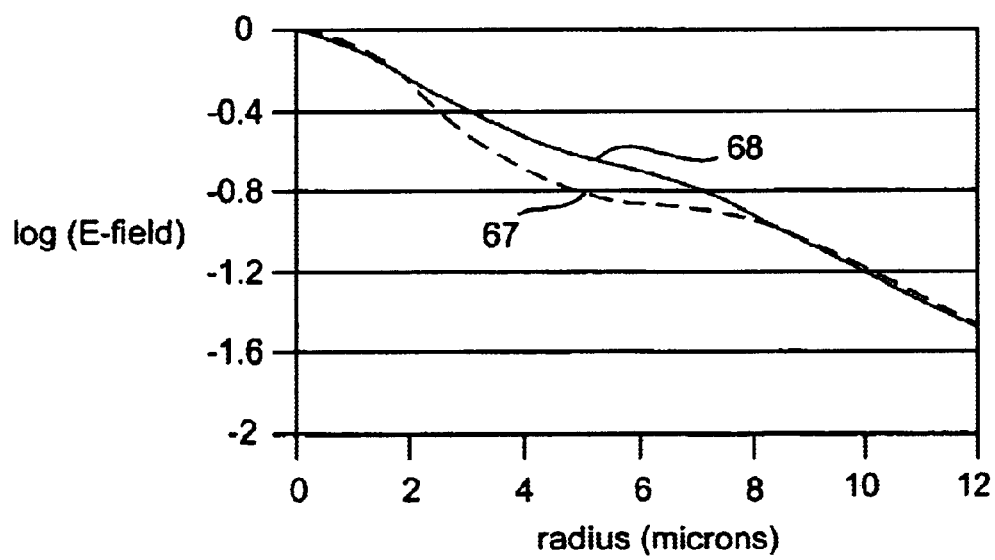
FIG. 13 shows a graphical representation of the magnitudes of the E-fields for the second preferred embodiment of a bridge fiber, illustrated in FIG. 11, and the second dispersion compensation fiber, illustrated in FIG. 2, after 0.7 seconds of fusion splicing.

FIG. 13 shows the calculated magnitude of the E-field versus radius of the dispersion compensating fiber of FIG. 3 and the bridge fiber of FIG. 11, each after 0.7 seconds of fusion splicing, in curves 67 and 68, respectively. The value of the E-field overlap integral for the curves shown in FIG. 13 was calculated to be 0.97, indicating an even higher degree of E-field matching after fusion (i.e. by tack splice) at the first junction.

The other end of the bridge fiber of FIG. 11 was modeled as being fusion spliced to a positive dispersion fiber, more particularly an NDSF, and even more particularly a step index single mode fiber represented by FIG. 3, for 4 seconds with an Ericsson 995 splicer. In FIG. 3, curves 40, 41, and 42 show the refractive index profile of the NDSF at or near the splice region before splicing, after 4 seconds of fusion splicing, and after 20 seconds of fusion splicing, respectively.

Figure 14:
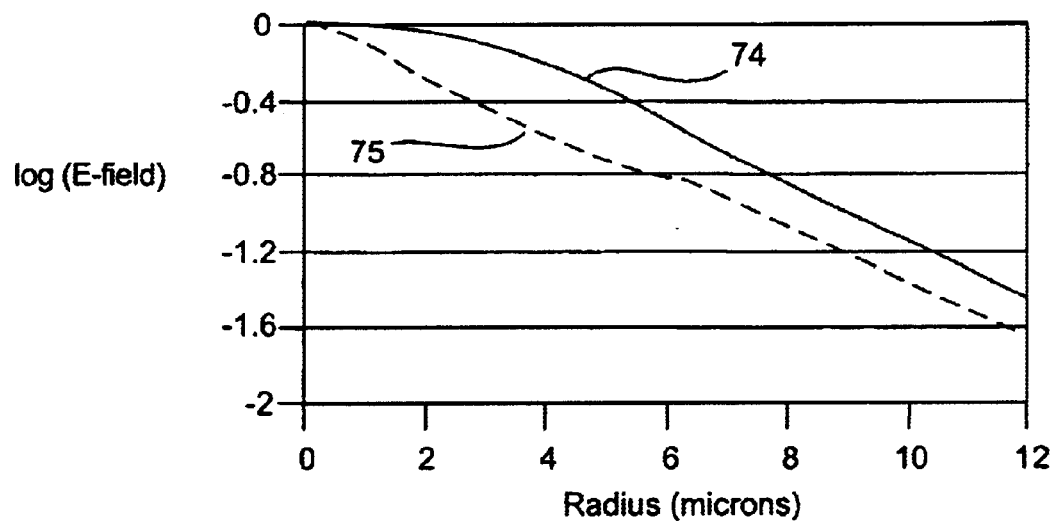
FIG. 14 shows a graphical representation of the magnitudes of the E-fields for the second preferred embodiment of a bridge fiber, illustrated in FIG. 11, and a step index single mode fiber, illustrated in FIG. 3, prior to being spliced together as disclosed herein.

FIG. 14 shows the calculated magnitude of the E-field versus radius of the NDSF fiber of FIG. 3 and the bridge fiber of FIG. 11 in curves 74 and 75, respectively, and the pre-splice E-field overlap was calculated to be 0.94, indicating some degree of mismatching of the E-field.

Figure 15:
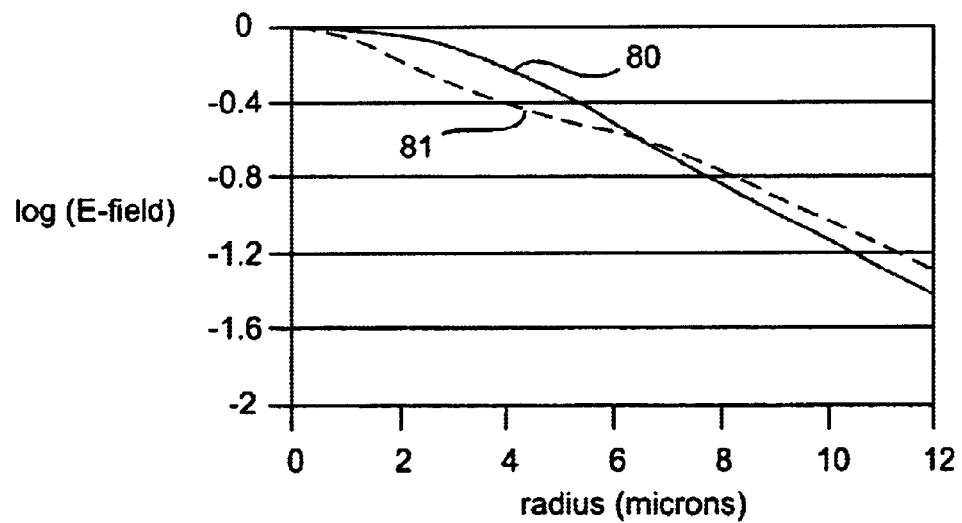
FIG. 15 shows a graphical representation of the magnitudes of the E-fields for the first preferred embodiment of a bridge fiber, illustrated in FIG. 11, and the step index single mode fiber, illustrated in FIG. 3, after 4 seconds of fusion splicing.

FIG. 15 shows the magnitude of the E-field versus radius of the NDSF fiber of FIG. 3 and the bridge fiber of FIG. 11, in curves 80 and 81, respectively, both after fusion splicing for 4 seconds, wherein the shapes of the E-field curves 80 and 81 reflect mismatch, and the E-field overlap was calculated to be 0.96, even though the mode field diameters at this end are approximately equal, as seen in Table 3 below. Table 3 shows the calculated results for mode field diameter at 1550 nm.

TABLE 3

| Fiber | Splice Time (sec) | MFD (microns) |
|---|---|---|
| Dispersion compensating fiber (FIG. 2) | 0 | 6.1 |
| Dispersion compensating fiber (FIG. 2) | 0.7 | 7.3 |
| Bridge fiber (FIG. 11) | 0 | 7.9 |
| Bridge fiber (FIG. 11) | 0.7 | 9.3 |
| Bridge fiber (FIG. 11) | 4 | 11.4 |
| Step index single mode (FIG. 3) | 0 | 11.4 |
| Step index single mode (FIG. 3) | 4 | 11.5 |

The MFD at the end of the dispersion compensating fiber of FIG. 2 grew from 6.1 microns to 7.3 microns, while the MFD at the end of the bridge fiber of FIG. 11 which was fusion spliced to the dispersion compensating fiber of FIG. 2 grew from 7.9 microns to 9.3 microns. The MFD at the end of the step index single mode fiber of FIG. 3 grew from 11.4 microns to 11.5 microns, while the MFD of the end of the bridge fiber of FIG. 11 which was fusion spliced to the step index single mode fiber of FIG. 3 grew from 7.9 microns to 11.4 microns. The majority of the length of the bridge fiber, which was unaffected by the fusion splicing at either end, remained at an MFD of 7.9 microns.

Table 4 shows the calculated results for splice loss at several wavelengths for the span comprised of dispersion compensating fiber of FIG. 2 fusion spliced to the bridge fiber of FIG. 11 at a first junction ("Splice A"), wherein the other end of the bridge fiber was fusion spliced to the NDSF of FIG. 3 at a second junction ("Splice B"). The overall loss was calculated to be 0.181 dB at 1550 nm.

TABLE 4

| Wavelength | 1480 nm | 1550 nm | 1610 nm |
|---|---|---|---|
| Splice A | 0.06 | 0.1 | 0.13 |
| Splice B | 0.22 | 0.2 | 0.23 |
| Total | 0.28 | 0.3 | 0.36 |

Splice A = Dispersion compensation fiber of FIG. 2 and bridge fiber of FIG. 11
Splice B = Bridge fiber of FIG. 11 and NDSF of FIG. 3

While the splice loss between the dispersion compensation fiber of FIG. 2 and bridge fiber of FIG. 11 was relatively low at 1550 nm (0.1 dB), the low splice loss at that junction (Splice A) was accompanied by a relatively higher splice loss of 0.2 dB at the second junction (Splice B) between the NDSF and the bridge fiber of FIG. 11 at 1550 nm (0.2 dB), leading to an overall loss of 0.3 dB. As seen in Table 4, wavelength dependence of the loss was relatively high. That is, the splice loss was not particularly flat in the wavelength region from 1480 nm to 1610 nm. The absolute value of the maximum difference between the overall splice losses between 1480 and 1610 nm was less than or equal to about 0.08 dB.

It should be noted that the relatively low splice loss (0.1 dB at 1550 nm) at the first junction was accompanied by a mode field diameter mismatch between the end of the dispersion compensation fiber of FIG. 2 (7.3 microns) and the end of the bridge fiber (9.3 microns), while the relatively higher loss (0.2 dB at 1550 nm) at the second junction was accompanied by a high degree of mode field diameter matching between the bridge fiber (11.4 microns) and the NDSF (11.5 microns).

Thus, a low overall loss was achieved by a high degree of E-field matching, as evidenced by post-splice E-field overlap values of 0.96 at the first junction (Splice A) and of 0.98 at the second junction (Splice B), even though a mode field diameter mismatch persisted at the first junction, where the post-splice MFD of the dispersion compensating fiber of FIG. 2 was 7.0 microns and the post-splice MFD of the bridge fiber of FIG. 11 at that end was 6.2 microns, and even though an even larger mode field diameter mismatch persisted at the second junction, where the post-splice MFD of the bridge fiber of FIG. 11 at that end was 10.3 microns, and the post-splice MFD of the NDSF was 12.3 microns.

Figure 16:
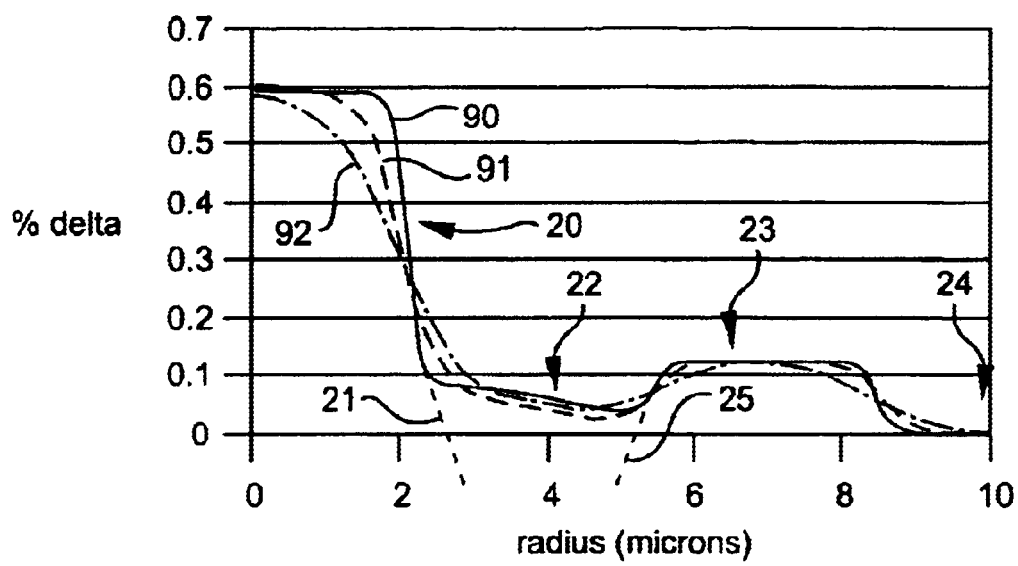
FIG. 16 shows a graphical representation of the refractive index profiles for a third preferred embodiment of a bridge fiber as disclosed herein, before splicing and after 0.7 and 4 seconds of splice time.

Referring to FIG. 16, in a third preferred embodiment the fiber disclosed herein preferably comprises: central core region comprised of a central core segment 20; an inner annular region comprised of first annular core segment 22 adjacent and surrounding the central core segment 20, and second annular core segment 23 adjacent and surrounding the first annular core segment 22; and an outer annular cladding region 24 adjacent and surrounding the second annular core segment 23. Thus, the bridge fiber disclosed herein preferably comprises three core segments: center core segment 20, first annular core segment 22, and second annular core segment 23. Center core segment 20 comprises a maximum relative refractive index or peak $\Delta$ or $\Delta_1$ % between 0.4 and 0.8, more preferably between 0.5 and 0.7, and a half-peak height radius of between about 1 and 3 microns, more preferably between about 1.5 and 2.5 microns. The first annular core segment 22, which may be referred to as a "pedestal" in this case, comprises a peak $\Delta$ or $\Delta_2$ % greater than 0 and less than 0.3%, more preferably greater than 0 and less than 0.2%, and begins from a radius of between about 1 microns to about 4 microns, more preferably from a radius of about 1.5 microns to about 3.5 microns, as defined by a straight line approximation wherein a straight line passes tangentially through the half-peak height of the central core segment 20 and is extrapolated to intersect with the $\Delta$ %=0 axis, as further discussed in Example 3 below.

The end of first annular core segment 22 and the beginning of second annular core segment 23 is defined herein to occur at a radius where a straight line approximation passes tangentially through the half-peak height of the centermost side of second annular core segment 23 and is extrapolated to intersect with the $\Delta$ %=0 axis. First annular core segment 22 ends and second annular core segment 23 begins between about 4 microns and about 7 microns, more preferably between about 4.5 microns and about 6.5 microns. Second annular core segment 23 has a peak $\Delta$ % or $\Delta_3$ % of between about 0.1% and 0.5%, more preferably between about 0.15% and 0.4%. Second annular core segment 23 ends where the $\Delta$ % falls to essentially 0%. The outer annular cladding region or cladding segment 24 is disposed adjacent and surrounding second annular core segment 23, and preferably begins from a radius of about 7 microns, more preferably from about 8 microns.

EXAMPLE 3

Referring to FIG. 16, curve 90 corresponds to the pre-splicing relative refractive index of the bridge fiber disclosed herein. The central core segment 20 has a $\Delta_1$ % of about 0.6% with a generally rounded trapezoidal or rounded step shape. Central core segment 20 has a half-peak height radius of about 2.1 microns. The end of central core segment 20 and the beginning of first annular core segment 22 in FIG. 16 is defined herein to start at a radius where a straight line approximation, indicated by line 21 which passes tangentially through the half-peak height of central core segment 20, in this case 0.3%, is extrapolated to intersect with the $\Delta$ %=0 axis, shown in FIG. 16 to intersect at about 2.4 microns. The first annular core segment 22, or pedestal, is preferably tapered as shown in FIG. 16 with a negative slope, but may have a substantially constant or flat profile with a very small or zero slope. Second annular core segment 23 has a peak $\Delta$ % or $\Delta_3$ % of about 0.12%. The pedestal extends to a radius of about 5.1 microns where the straight line approximation indicated by line 25 in FIG. 16 which passes tangentially through the half-peak height, in this case about 0.06% and which is extrapolated to intersect with the $\Delta$ %=0 axis. Second annular core segment 25 extends to a radius of about 8.9 microns where the relative refractive index is essentially 0%, wherein the outer annular cladding region 24 commences. The outer annular cladding region 24 preferably consists of pure silica.

In FIG. 16, curves 91 and 92 correspond to the relative refractive index of the bridge fiber after 0.7 seconds and 4 seconds of fusion splicing, respectively, as calculated by solution of the diffusion equation. FIG. 2 shows two curves, 63 and 64, representing the refractive index profile of the dispersion compensation fiber at or near the splice region before splicing and after 0.7 seconds of fusion splicing, respectively, as calculated by solution of the diffusion equation.

One end of the bridge fiber of FIG. 16 was modeled as being fusion spliced to the dispersion compensating fiber of FIG. 2 for 0.7 seconds with a Fuji 30S splicer.

Figure 17:
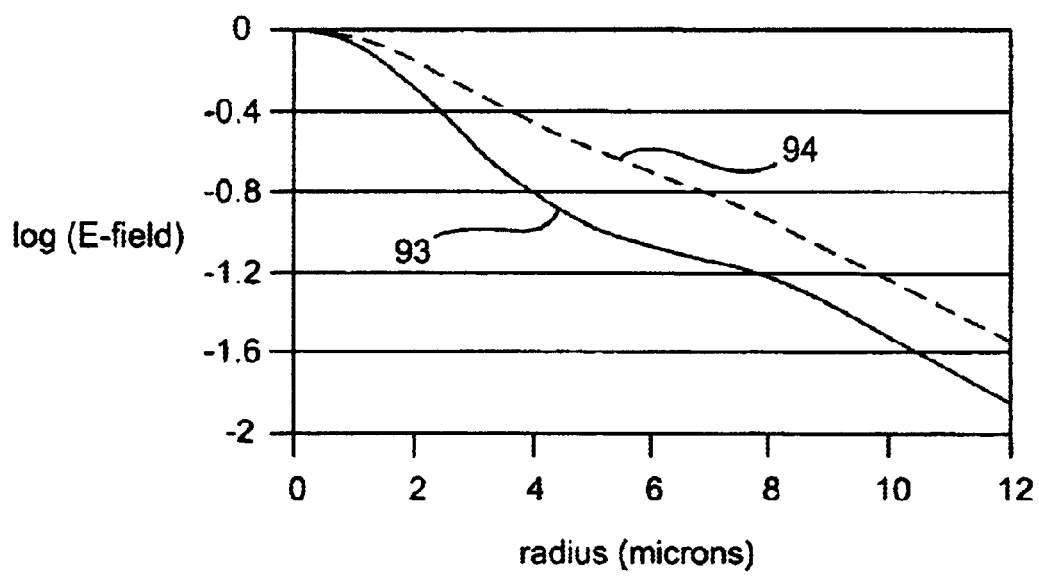
FIG. 17 shows a graphical representation of the magnitudes of the E-fields for the third preferred embodiment of a bridge fiber, illustrated in FIG. 16, and a second dispersion compensation fiber, illustrated in FIG. 2, prior to being spliced together as disclosed herein.

FIG. 17 shows the calculated magnitude of the E-field versus radius of the dispersion compensating fiber of FIG. 2 and the bridge fiber of FIG. 16, each prior to splicing, in curves 93 and 94, respectively. The E-fields of the dispersion compensation fiber of FIG. 2 and the bridge fiber of FIG. 16, before splicing, The value of the E-field overlap integral for these two fibers, before splicing, calculated to be 0.92 indicating a high degree of E-field mismatch, as also evident from the disparity in the shapes of the curves in FIG. 17.

Figure 18:
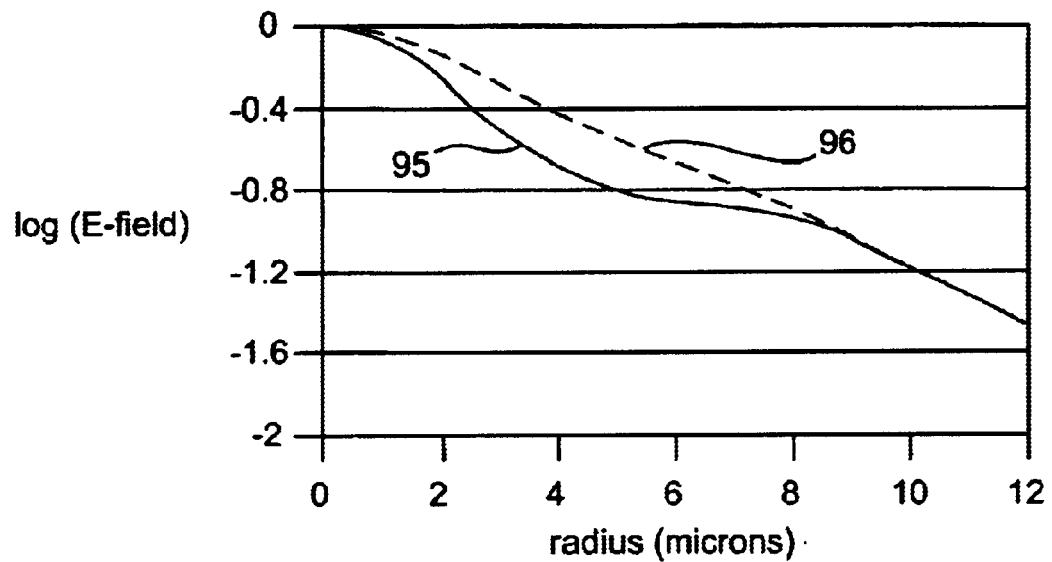
FIG. 18 shows a graphical representation of the magnitudes of the E-fields for the third preferred embodiment of a bridge fiber, illustrated in FIG. 16, and the second dispersion compensation fiber, illustrated in FIG. 2, after 0.7 seconds of fusion splicing.

FIG. 18 shows the calculated magnitude of the E-field versus radius of the dispersion compensating fiber of FIG. 3 and the bridge fiber of FIG. 16, each after 0.7 seconds of fusion splicing, in curves 95 and 96, respectively, wherein good overlap occurs after 8 microns but otherwise a mismatch in e-field shape is maintained between a radius of 0 and 8 microns. The E-field overlap for the curves shown in FIG. 18 was calculated to be 0.96, indicating a good degree of E-field matching but nonetheless worse E-field matching than that obtained in Example 2 above at the junction between the bridge fiber of FIG. 16 and the dispersion compensation fiber of FIG. 2, which yielded an overlap value of 0.97.

The other end of the bridge fiber of FIG. 16 was modeled as being fusion spliced to a positive dispersion fiber, more particularly an NDSF, and even more particularly a step index single mode fiber represented by FIG. 3, for 4 seconds with an Ericsson 995 splicer. In FIG. 3, curves 40, 41, and 42 show the refractive index profile of the NDSF at or near the splice region before splicing, after 4 seconds of fusion splicing, and after 20 seconds of fusion splicing, respectively.

Figure 19:
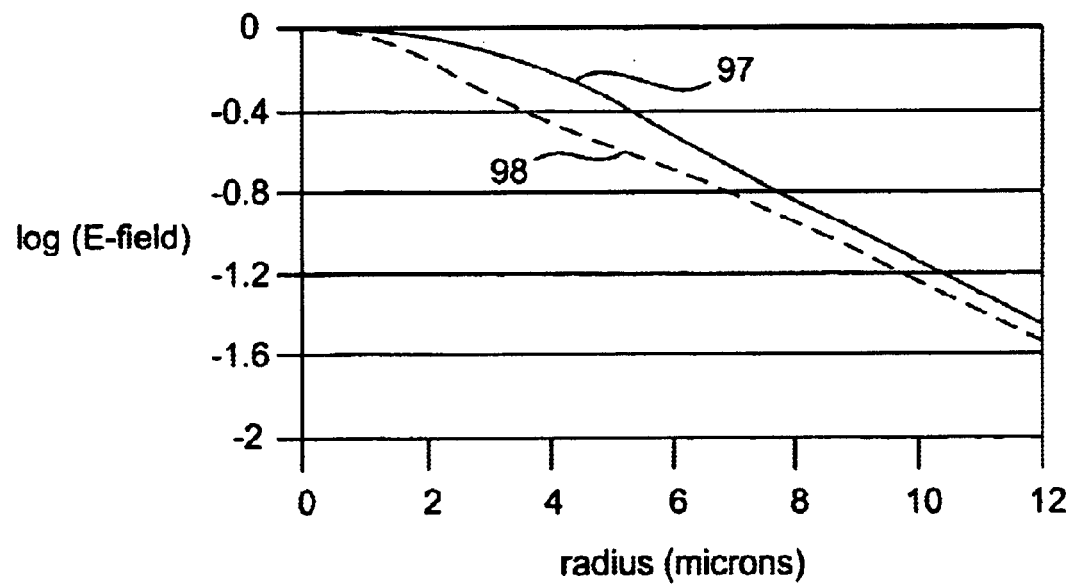
FIG. 19 shows a graphical representation of the magnitudes of the E-fields for the third preferred embodiment of a bridge fiber, illustrated in FIG. 16, and a step index single mode fiber, illustrated in FIG. 3, prior to being spliced together as disclosed herein.

FIG. 19 shows the calculated magnitude of the E-field versus radius of the NDSF fiber of FIG. 3 and the bridge fiber of FIG. 16 in curves 97 and 98, respectively, and the pre-splice E-field overlap was calculated to be 0.97.

Figure 20:
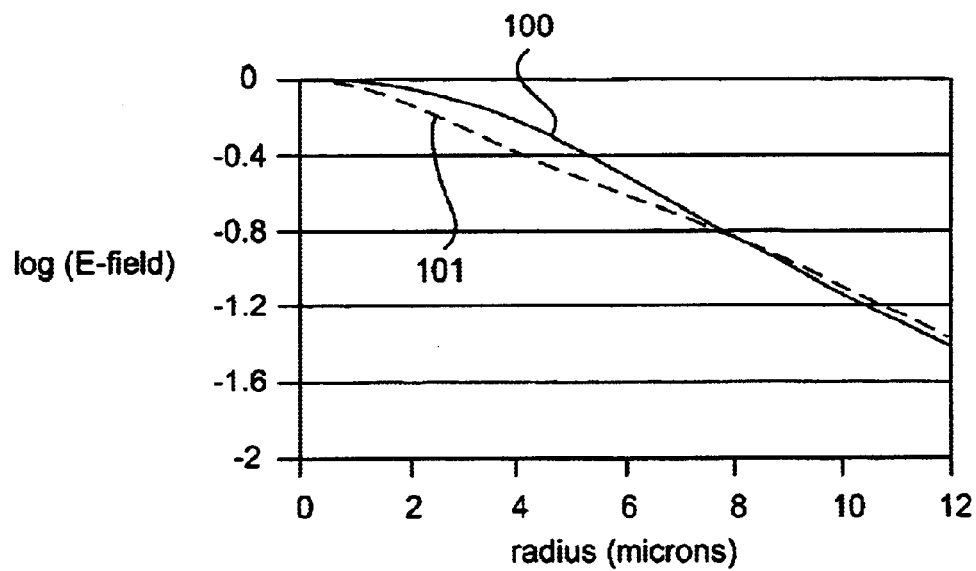
FIG. 20 shows a graphical representation of the magnitudes of the E-fields for the third preferred embodiment of a bridge fiber, illustrated in FIG. 16, and the step index single mode fiber, illustrated in FIG. 3, after 4 seconds of fusion splicing.

FIG. 20 shows the magnitude of the E-field versus radius of the NDSF fiber of FIG. 3 and the bridge fiber of FIG. 16, in curves 100 and 101, respectively, both after fusion splicing for 4 seconds, and the E-field overlap was calculated to be 0.98, indicating a high degree of E-field matching even though the mode field diameters at this end are mismatched as shown below in Table 5. Table 5 shows the calculated results for mode field diameter at 1550 nm.

TABLE 5

| Fiber | Splice Time (sec) | MFD (microns) | Cutoff (nm) |
|---|---|---|---|
| Dispersion compensating fiber (FIG. 2) | 0 sec | 6.1 | |
| Dispersion compensating fiber (FIG. 2) | 0.7 sec | 7.3 | |
| Bridge fiber of FIG. 16 | 0 sec | 9.5 | 1460 |
| Bridge fiber of FIG. 16 | 0.7 sec | 9.9 | 1441 |
| BF #3 | 4 sec | 10.8 | 1436 |
| Step index single mode (FIG. 3) | 0 sec | 11.4 | |
| Step index single mode (FIG. 3) | 4 sec | 11.5 | |

The MFD at the end of the dispersion compensating fiber of FIG. 2 grew from 6.1 microns to 7.3 microns, while the MFD at the end of the bridge fiber of FIG. 16 which was fusion spliced to the dispersion compensating fiber of FIG. 2 grew from 9.5 microns to 9.9 microns. The MFD at the end of the step index single mode fiber of FIG. 3 grew from 11.4 microns to 11.5 microns, while the MFD of the end of the bridge fiber of FIG. 16 which was fusion spliced to the step index single mode fiber of FIG. 3 grew from 9.5 microns to 10.8 microns. The majority of the length of the bridge fiber, which was unaffected by the fusion splicing at either end, remained at an MFD of 9.5 microns.

Table 6 shows the calculated results for splice loss at several wavelengths for the span comprised of dispersion compensating fiber of FIG. 2 fusion spliced to the bridge fiber of FIG. 16 at a first junction ("Splice A"), wherein the other end of the bridge fiber was fusion spliced to the NDSF of FIG. 3 at a second junction ("Splice B"). The overall loss was calculated to be 0.24 dB at 1550 nm.

Table 6 shows the measured results for splice loss at several wavelengths.

TABLE 6

| Wavelength | 1480 nm | 1550 nm | 1610 nm |
|---|---|---|---|
| Splice A | 0.16 | 0.17 | 0.2 |
| Splice B | 0.085 | 0.07 | 0.07 |
| Total | 0.245 | 0.24 | 0.27 |

Splice A = Dispersion Compensation Fiber of FIG. 2 - Bridge fiber of FIG. 16
Splice B = Bridge fiber of FIG. 16 - NDSF Although the splice loss at the first junction (Splice A) between the dispersion compensation fiber of FIG. 2 and the bridge fiber of FIG. 16 was relatively higher (0.17 dB) than the splice loss at the first junction in Example 2 above (i.e. 0.1 dB), the splice loss at the second junction (Splice B) between the NDSF and the bridge fiber of FIG. 16 was considerably lower than the splice loss at the second junction in Example 2 (i.e. 0.2 dB), so that the overall loss for Example 3 (0.24 dB), was lower as compared to the overall loss in Example 2 (0.3 dB). Thus, a bridge fiber may be selected so that the combined splice losses from both ends of the bridge fiber yield a lower overall splice loss. As seen in Table 6, the splice losses also have a good spectral flatness, or wavelength independence, or wavelength transparency, around 1550 nm, or within the wavelength region of 1480 nm to 1610 nm. The absolute value of the maximum difference between the overall splice losses between 1480 and 1610 nm was less than or equal to about 0.03 dB.

Figure 21:
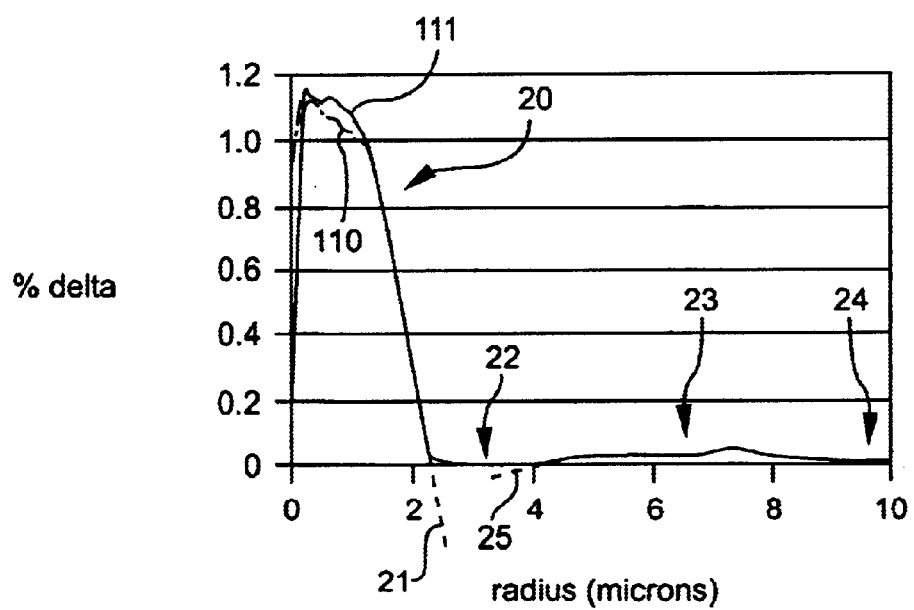
FIG. 21 shows a graphical representation of the refractive index profiles for a fourth preferred embodiment of a bridge fiber made by both OVD and PCVD methods as disclosed herein, before splicing.

Referring to FIG. 21, in a fourth preferred embodiment the fiber disclosed herein preferably comprises: central core region comprised of a central core segment 20; an inner annular region comprised of first annular core segment 22 adjacent and surrounding the central core segment 20, and second annular core segment 23 adjacent and surrounding the first annular core segment 22; and an outer annular cladding region 24 adjacent and surrounding the second annular core segment 23.

Thus, the bridge fiber disclosed herein preferably comprises three core segments: center core segment 20, first annular core segment 22, and second annular core segment 23. Center core segment 20 comprises a maximum relative refractive index or peak $\Delta$ or $\Delta_1$ % between 0.9 and 1.3, more preferably between 1.0 and 1.2, and a half-peak height radius of between about 1 and 3 microns, more preferably between about 1.5 and 2.5 microns. The first annular core segment 22 comprises a peak $\Delta$ or $\Delta_2$ % of essentially 0%, and begins from a radius of between about 1 microns to about 4 microns, more preferably from a radius of about 1.5 microns to about 3.5 microns, as defined by a straight line approximation wherein a straight line passes tangentially through the half-peak height of the central core segment 20 and is extrapolated to intersect with the $\Delta$ %=0 axis, as further discussed in Example 4 below.

The end of first annular core segment 22 and the beginning of second annular core segment 23 is defined herein to occur at a radius where a straight line approximation passes tangentially through the half-peak height of the centermost side of second annular core segment 23 and is extrapolated to intersect with the $\Delta$ %=0 axis. First annular core segment 22 ends and second annular core segment 23 begins between about 3 microns and about 5 microns, more preferably between about 3.5 microns and about 4.5 microns. Second annular core segment 23 has a peak $\Delta$ % or $\Delta_3$ % of between about 0.02% and 0.2%, more preferably between about 0.04% and 0.15%. Second annular core segment 23 ends where the $\Delta$ % falls to essentially 0%. The outer annular cladding region or cladding segment 24 is disposed adjacent and surrounding second annular core segment 23, and preferably begins from a radius of about 7 microns, more preferably from about 8 microns.

EXAMPLE 4

Referring to FIG. 21, curves 110 and 111 depict the York profiles of the pre-splicing relative refractive index of the bridge fiber disclosed herein as manufactured according to the OVD method and the PCVD method, respectively. The central core segment 20 has a $\Delta_1$ % of about 1.15% with a generally rounded trapezoidal or rounded step shape. Central core segment 20 has a half-peak height radius of about 1.8 microns. The end of central core segment 20 and the beginning of first annular core segment 22 in FIG. 21 is defined herein to start at a radius where a straight line approximation, indicated by line 21 which passes tangentially through the half-peak height of central core segment 20, in this case 0.58%, is extrapolated to intersect with the $\Delta$ %=0 axis, shown in FIG. 21 to intersect at about 2.3 microns. The first annular core segment 22 preferably has a $\Delta$ % essentially equal to zero and has a substantially constant or flat profile. Second annular core segment 23 has a peak $\Delta$ % or $\Delta_3$ % of about 0.06%. The first annular core segment 22 extends to a radius of about 4 microns where the straight line approximation indicated by line 25 in FIG. 21 which passes tangentially through the half-peak height, in this case about 0.03% and which is extrapolated to intersect with the Δ %=0 axis. Second annular core segment 25 extends to a radius of about 9 microns where the relative refractive index is essentially 9%, wherein the outer annular cladding region 24 commences. The outer annular cladding region 24 preferably consists of pure silica.

As seen in the York profile readings of FIG. 21, a so-called "centerline depression" occurs from a radius of 0.0 to about 0.2 microns, and is due to the particular method of manufacture of the fiber.

Various embodiments of the fiber disclosed herein could be made via OVD, PCVD, IVD, VAD, or MCVD methods, or by any other appropriate method known by the skilled artisan.

Figure 22:
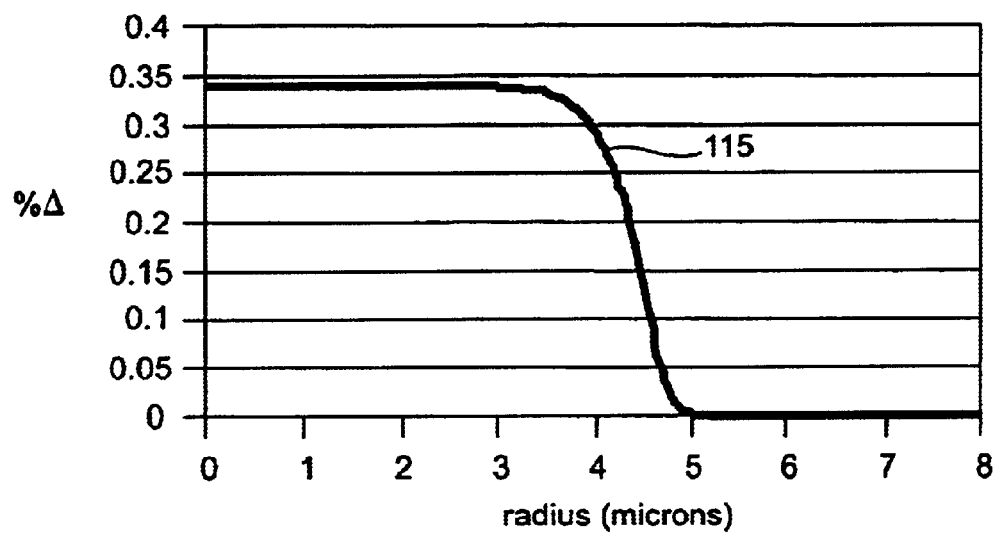
FIG. 22 shows a graphical representation of the refractive index profiles for a second exemplary step index single mode fiber, before splicing.

FIG. 22 shows the relative refractive index percent profile of another positive dispersion fiber or NDSF. The fiber has a step-index profile with a maximum relative refractive index percent of 0.33% with a half height at about 4.5 microns. The relative refractive index percent falls to 0% at about 4.8 to 5.0 microns, followed by an outer annular cladding region.

In a preferred embodiment, one end of the bridge fiber of FIG. 21 was fusion spliced (Splice A) to a dispersion compensation fiber having a relative refractive index profile similar in shape to those represented in FIGS. 1 and 2 and having a dispersion of between −80 and −120 ps/nm-km in the 1550 nm region. Such dispersion compensation fibers are suitable for use in a dispersion compensation module (DCM). The bridge fiber of FIG. 21 was spliced for 1.7 seconds with a Fuji 30S splicer. The other end of the bridge fiber of FIG. 21 was fusion spliced (Splice B) to the step index single mode fiber represented by FIG. 22 for 12 seconds with an Ericsson 995 splicer.

Table 7 shows the measured results for splice losses at several wavelengths.

TABLE 7

| Wavelength | 1480 nm | 1550 nm | 1610 nm |
| --- | --- | --- | --- |
| Splice A | 0.21 | 0.18 | 0.19 |
| Splice B | 0.08 | 0.07 | 0.07 |
| Total | 0.28 | 0.26 | 0.26 |

Splice A = Dispersion compensation fiber (−100 +/−20 ps/nm-km) and bridge fiber of FIG. 21
Splice B = Bridge fiber of FIG. 21 and NDSF of FIG. 22

The bridge fiber of FIG. 21 has combined splice losses from both ends of the bridge fiber which are less than 0.29 dB, and the splice losses also have a good spectral flatness, or wavelength independence, or wavelength transparency, around 1550 nm, or within the wavelength region of 1480 nm to 1610 nm. The absolute value of the maximum difference between the overall splice losses between 1480 and 1610 nm was less than or equal to about 0.02 dB.

In another preferred embodiment, one end of the bridge fiber of FIG. 6 was fusion spliced (Splice A) to a dispersion compensation fiber having a relative refractive index profile similar in shape to those represented in FIGS. 1 and 2 and having a dispersion of between −80 and −120 ps/nm-km. The bridge fiber of FIG. 6 was spliced for 1.7 seconds with a Fuji 30S splicer. The other end of the bridge fiber of FIG. 6 was fusion spliced (Splice B) to the step index single mode fiber represented by FIG. 22 for 18 seconds with an Ericsson 995 splicer.

Table 8 shows the measured results for splice loss at several wavelengths.

TABLE 8

| Wavelength | 1480 nm | 1550 nm | 1610 nm |
| --- | --- | --- | --- |
| Splice A | 0.23 | 0.20 | 0.22 |
| Splice B | 0.04 | 0.05 | 0.06 |
| Total | 0.27 | 0.25 | 0.28 |

Splice A = Dispersion compensation fiber (−100 +/−20 ps/nm-km) and bridge fiber of FIG. 6
Splice B = Bridge fiber of FIG. 6 and NDSF of FIG. 22

The bridge fiber of FIG. 1 in this span has combined splice losses from both ends of the bridge fiber which are less than 0.29 dB, and the splice losses also have a good spectral flatness, or wavelength independence, or wavelength transparency, around 1550 nm, or within the wavelength region of 1480 nm to 1610 nm. The absolute value of the maximum difference between the overall splice losses between 1480 and 1610 nm was less than or equal to about 0.03 dB.

EXAMPLE 5

Figure 23:
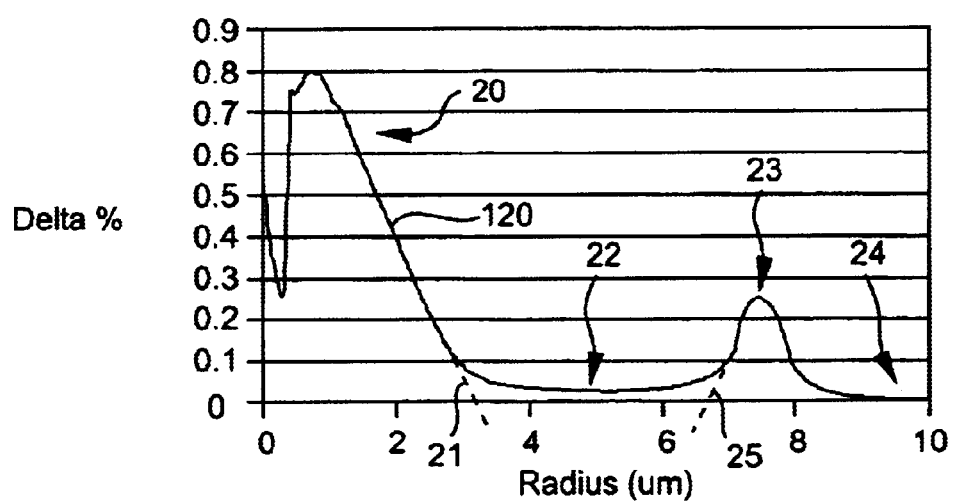
FIG. 23 shows a graphical representation of the refractive index profile for a fifth preferred embodiment of a bridge fiber, before splicing, as disclosed herein.

Referring to FIG. 23, curve 120 shows the York profile of the pre-splicing relative refractive index of another embodiment of the bridge fiber disclosed herein. The central core segment 20 has a $\Delta_1$ % of about 0.80% with a generally rounded trapezoidal shape. Central core segment 20 has a half-peak height radius of about 2 microns. The end of central core segment 20 and the beginning of first annular core segment 22 in FIG. 23 is defined herein to start at a radius where a straight line approximation, indicated by line 21 which passes tangentially through the half-peak height of central core segment 20, in this case 0.40%, is extrapolated to intersect with the Δ %=0 axis, shown in FIG. 23 to intersect at about 3.1 microns. The first annular core segment 22 preferably has a Δ % essentially equal to zero and has a substantially constant or flat profile. Second annular core segment 23 has a peak Δ % or $\Delta_3$ % of about 0.25%. The first annular core segment 22 extends to a radius of about 6.8 microns where the straight line approximation indicated by line 25 in FIG. 23 which passes tangentially through the half-peak height, in this case about 0.125% and which is extrapolated to intersect with the Δ %=0 axis. Second annular core segment 25 extends to a radius of about 9 microns where the relative refractive index is essentially 0%, wherein the outer annular cladding region 24 commences. The outer annular cladding region 24 preferably consists of pure silica.

As seen in the York profile readings of FIG. 23, a so-called "centerline depression" occurs from a radius of 0.0 to about 0.45 microns, and is due to the particular method of manufacture of the fiber.

In a preferred embodiment, one end of the bridge fiber of FIG. 23 was fusion spliced (Splice A) to the compensative fiber of FIG. 2 for 1.5 seconds with a Fuji 30S splicer. The other end of the bridge fiber of FIG. 23 was fusion spliced (Splice B) to the step index single mode fiber represented by FIG. 3 for 7 seconds with an Ericsson 995 splicer.

Table 9 shows the measured results for splice losses at several wavelengths.

TABLE 9

| Wavelength | 1480 nm | 1550 nm | 1610 nm |
|---|---|---|---|
| Splice A | 0.25 | 0.24 | 0.25 |
| Splice B | 0.2 | 0.2 | 0.2 |
| Total | 0.45 | 0.44 | 0.45 |

Splice A = Compensative fiber of FIG. 2 and bridge fiber of FIG. 23
Splice B = Bridge fiber of FIG. 23 and NDSF of FIG. 3

The bridge fiber of FIG. 23 had combined splice losses from both ends of the bridge fiber which were less than or equal to about 0.25 dB at each end. The absolute value of the maximum difference between the overall splice losses between 1480 and 1610 nm was less than or equal to about 0.01 dB.

EXAMPLE 6

Figure 24:
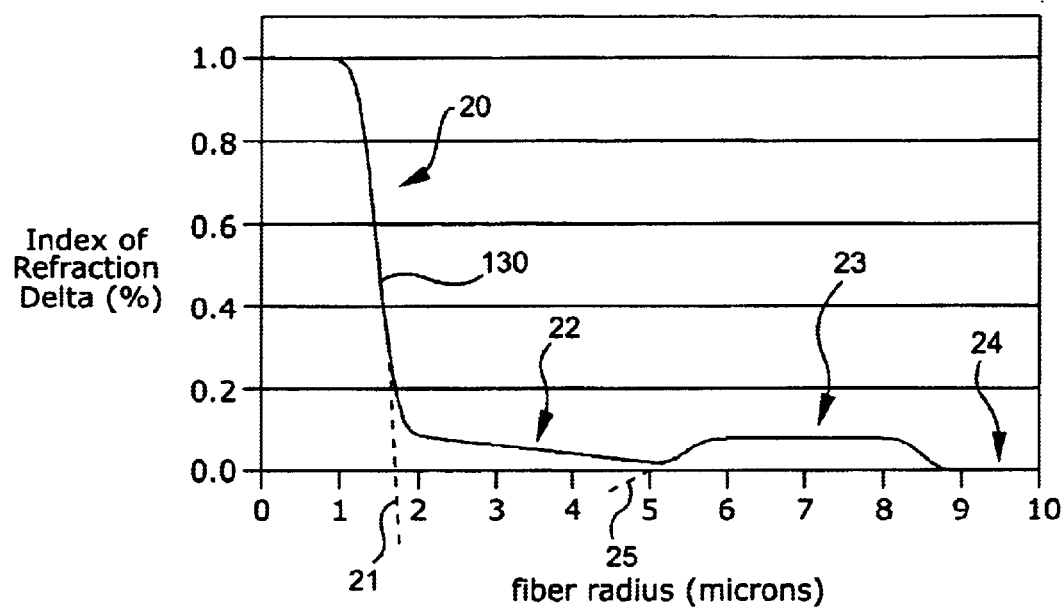
FIG. 24 shows the pre-splicing relative refractive index of another preferred embodiment of the bridge fiber disclosed herein.

Referring to FIG. 24, curve 130 corresponds to the pre-splicing relative refractive index of another preferred embodiment of the bridge fiber disclosed herein. The central core segment 20 has a $\Delta_1\%$ of about 1% with a generally rounded trapezoidal or rounded step shape. Central core segment 20 has a half-peak height radius of about 1.5 microns. The end of central core segment 20 and the beginning of first annular core segment 22 in FIG. 24 is defined herein to start at a radius where a straight line approximation, indicated by line 21 which passes tangentially through the half-peak height of central core segment 20, in this case 0.5%, is extrapolated to intersect with the $\Delta$ %=0 axis, shown in FIG. 24 to intersect at about 1.8 microns. The first annular core segment 22, or pedestal, is preferably tapered as shown in FIG. 24 with a negative slope, but may have a substantially constant or flat profile with a very small or zero slope. Second annular core segment 23 has a peak $\Delta$ % or $\Delta_3$ % of about 0.08%. The pedestal extends to a radius of about 5 microns where the straight line approximation indicated by line 25 in FIG. 24 which passes tangentially through the half-peak height, in this case about 0.04% and which is extrapolated to intersect with the $\Delta$ %=0 axis. Second annular core segment 25 extends to a radius of about 8.8 microns where the relative refractive index is essentially 0%, wherein the outer annular cladding region 24 commences. The outer annular cladding region 24 preferably consists of pure silica.

Figure 25:
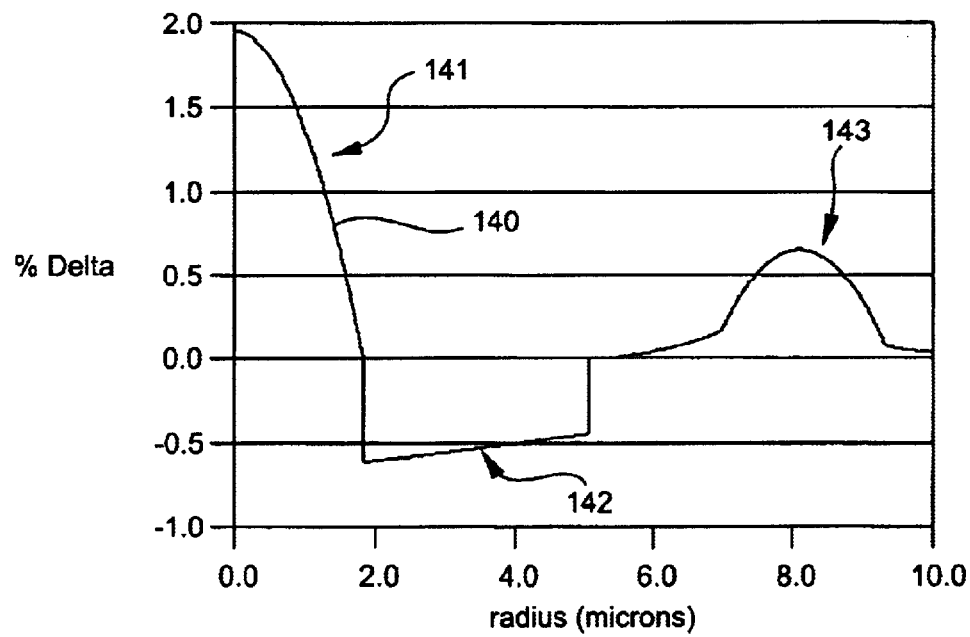
FIG. 25 shows the relative refractive index of an optical fiber, having negative dispersion and negative dispersion slope over an operating wavelength, to be fused to an end of a bridge fiber disclosed herein.

In one preferred embodiment, one end of the bridge fiber of FIG. 24 is fused to a fiber having negative dispersion and negative dispersion slope over the operating wavelength, for example as represented by the refractive index profile depicted as curve 140 in FIG. 25. The fiber represented by FIG. 25 has a central core segment 141 which extends to the radius where curve 140 first crosses the $\Delta$ %=0 axis to thereafter turn negative, an annular cylindrical moat segment 142 surrounding the central core segment 141 and preferably adjacent and abutting the central core segment 141 wherein the moat segment 142 extends to the radius where curve 140 again crosses the $\Delta$ %=0 axis to thereafter turn non-negative, and an annular ring segment 143 surrounding the moat segment. The ring segment 143 is further surrounded by a cladding. Cladding preferably extends to a radius of about 62.5 µm from the centerline of the optical fiber. Preferably, the fiber represented by FIG. 25 has a central core segment with a maximum $\Delta$ % greater than 1.5%, a moat segment with a $\Delta$ % more negative than −0.5%, and ring segment with a maximum $\Delta$ % that is greater than 0.5%. As shown by the exemplary profile in FIG. 25, central core segment has a maximum $\Delta$ % of about 1.9%, a moat segment with a $\Delta$ % of about −0.6%, and ring segment with a maximum $\Delta$ % of about 0.65%. Also, the fiber represented by FIG. 25 preferably has a central core segment having an outer radius R1 in a range of between about 1.5 µm and 2.2 µm, a moat segment having an outer radius R2 in a range of between about 5.0 µm and 6.7 µm, and a ring segment having a midpoint radius R3 in the range of between about 6.5 µm and 9.0 µm. Aspects of the refractive index profile depicted in FIG. 25, such as the moat and ring location, could be made in order to adjust the desired dispersion slope and dispersion attributes of the optical fiber. For example, dispersion values in the range of −100 to −300 ps/nm-km at 1549 nm can be achieved with the refractive index profile of FIG. 25.

In at least one preferred arrangement, the other end of the bridge fiber of FIG. 24 is connected to a positive dispersion fiber, such as a non-dispersion-shifted fiber ("NDSF") or such as a step index single mode fiber represented in FIG. 3 or FIG. 22, or other positive dispersion, positive slope fiber.

In one preferred embodiment, one end of the bridge fiber of FIG. 24 was fused to the negative dispersion, negative slope fiber represented by FIG. 25 using a Fujikura 30S splicer with an arc current setting of 40 bits for an arc time of 0.7 seconds, and the other end was fused to the positive dispersion, positive slope fiber represented by FIG. 22 using an Ericsson 995 splicer with an arc current of 16 mA for an arc time of 7 seconds.

Table 10 shows the measured results for splice losses at several wavelengths.

TABLE 10

| Wavelength | 1520 nm | 1550 nm | 1570 nm |
|---|---|---|---|
| Splice A | 0.95 | 0.98 | 1.00 |
| Splice B | 0.11 | 0.10 | 0.12 |
| Total | 1.06 | 1.08 | 1.12 |

Splice A = Compensative fiber of FIG. 25 and bridge fiber of FIG. 24
Splice B = Bridge fiber (FIG. 24) and positive dispersion, positive slope fiber (FIG. 22)

The bridge fiber of FIG. 24 had combined splice losses from both ends of the bridge fiber which were less than or equal to about 1 dB at each end. The absolute value of the maximum difference between the overall splice losses between 1520 and 1570 nm was less than or equal to about 0.05 dB.

Figure 26:
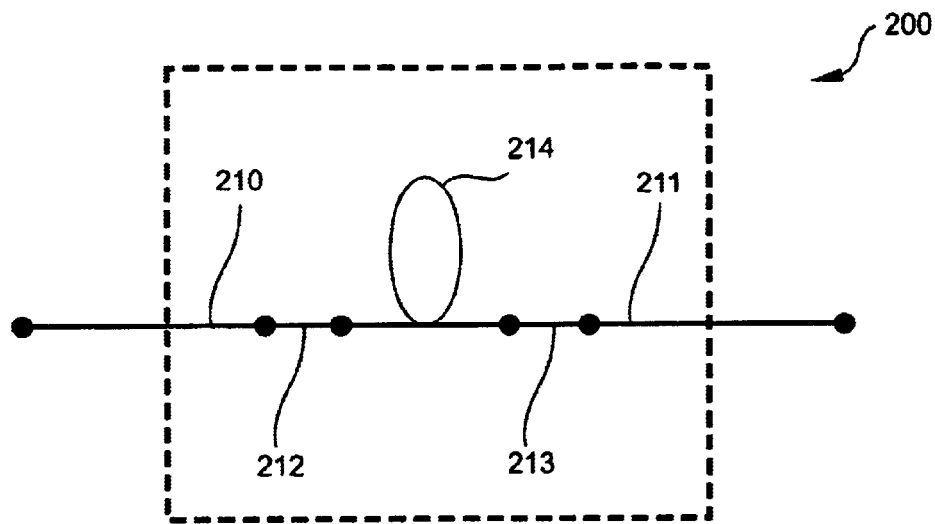
FIG. 26 shows a schematic representation of a preferred embodiment of a dispersion compensation module as disclosed herein.

FIG. 26 shows a schematic representation of a preferred embodiment of a dispersion compensation module 200 as disclosed herein. The dispersion compensation module 200 comprises a first pigtail fiber 210, a second pigtail fiber 211, a dispersion compensation fiber 214, a first bridge fiber 212 having a first end connected to the first end of the dispersion compensation fiber and a second end connected to the first pigtail fiber, and a second bridge fiber 213 having a first end connected to the second end of the dispersion compensation fiber and a second end connected to the second pigtail fiber. In one preferred embodiment, the first and second pigtail fibers 210, 211 are positive dispersion, positive dispersion slope fibers having a refractive index profile such as the profile depicted in FIG. 22, the dispersion compensation fiber 214 is a negative dispersion, negative dispersion slope fiber having a refractive index profile such as, for example, the profile depicted in FIG. 25. Preferably at least one connection between fibers, and more preferably all connections between fibers, within the module are formed by fusing the respective fibers together.

Figure 27:
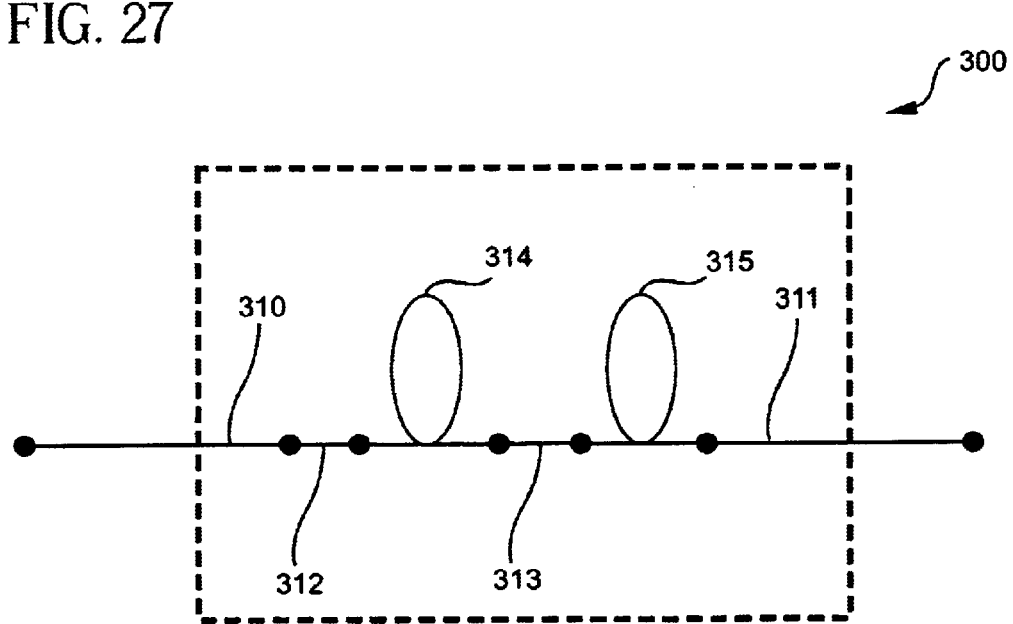
FIG. 27 shows a schematic representation of another preferred embodiment of a dispersion compensation module as disclosed herein.

FIG. 27 shows a schematic representation of another preferred embodiment of a dispersion compensation module 300 as disclosed herein. The dispersion compensation module 300 comprises a first pigtail fiber 310, a second pigtail fiber 311, a dispersion compensation fiber 314 having negative dispersion and negative dispersion slope, a trim fiber 315 having positive dispersion and positive dispersion slope, a first bridge fiber 312 having a first end connected to the first end of the dispersion compensation fiber and a second end connected to the first pigtail fiber, and a second bridge fiber 313 having a first end connected to the second end of the dispersion compensation fiber and a second end connected to the trim fiber, wherein the trim fiber 315 is connected to the second pigtail fiber. In one preferred embodiment, the first and second pigtail fibers are positive dispersion, positive dispersion slope fibers, and the dispersion compensation fiber is a negative dispersion, negative dispersion slope fiber. Preferably at least one connection between fibers, and more preferably all connections between fibers, within the module are formed by fusing the respective fibers together. Preferably, the length of the trim fiber is greater than about 200 m, more preferably greater than about 500 m.

EXAMPLE 7

Figure 28:
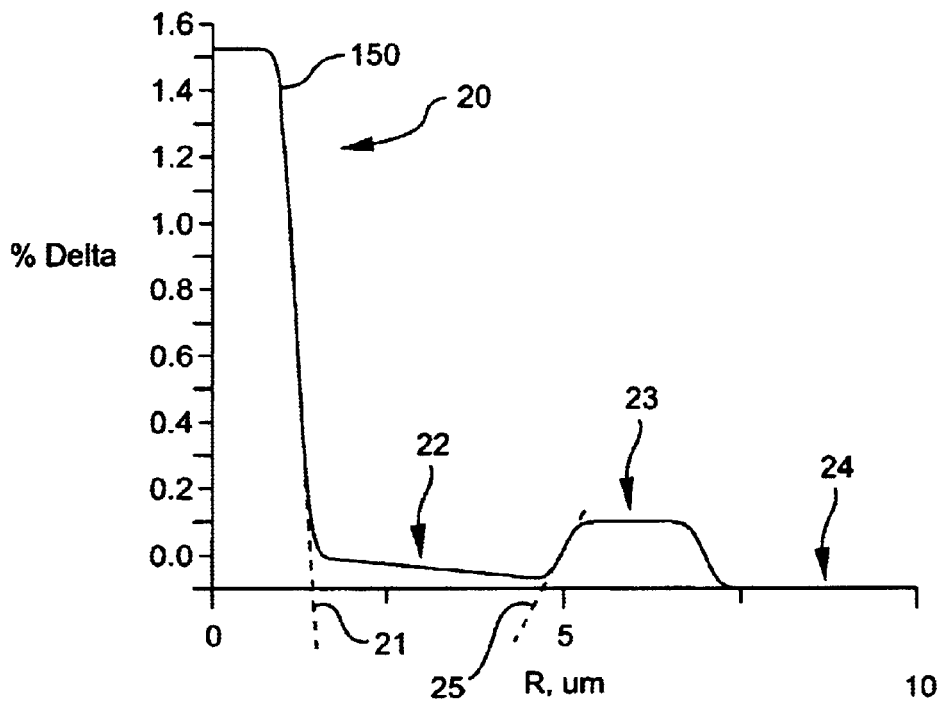
FIG. 28 shows the pre-splicing relative refractive index of another preferred embodiment of the bridge fiber disclosed herein.

Referring to FIG. 28, curve 150 corresponds to the pre-splicing relative refractive index of another preferred embodiment of the bridge fiber disclosed herein. The central core segment 20 has a $\Delta_1$ % of about 1.55% with a generally rounded trapezoidal or rounded step shape. Central core segment 20 has a half-peak height radius of about 1.2 microns. The end of central core segment 20 and the beginning of first annular core segment 22 in FIG. 28 is defined herein to start at a radius where a straight line approximation, indicated by line 21 which passes tangentially through the half-peak height of central core segment 20, in this case about 0.8%, is extrapolated to intersect with the $\Delta$ %=0 axis, shown in FIG. 28 to intersect at about 1.4 microns. The first annular core segment 22, or pedestal, is preferably tapered as shown in FIG. 28 with a negative slope, but may have a substantially constant or flat profile with a very small or zero slope. Second annular core segment 23 has a peak $\Delta$ % or $\Delta_3$ % of about 0.2%. The pedestal extends to a radius of about 4.7 microns where the straight line approximation indicated by line 25 in FIG. 28 which passes tangentially through the half-peak height, in this case about 0.1% and which is extrapolated to intersect with the $\Delta$ %=0 axis. Second annular core segment 25 extends to a radius of about 7.5 microns where the relative refractive index is essentially 0%, wherein the outer annular cladding region 24 commences. The outer annular cladding region 24 preferably consists of pure silica. The optical fiber of FIG. 28 has an effective area of about 27 $\mu m^2$ at 1550 nm, about 22 $\mu m^2$ at 1480 nm, and about 32 $\mu m^2$ at 1610 nm, and a mode field diameter of about 5.9 $\mu m$ at 1550 nm, about 5.4 $\mu m$ at 1480 nm, and about 6.4 $\mu m$ at 1610 nm.

Figure 29:
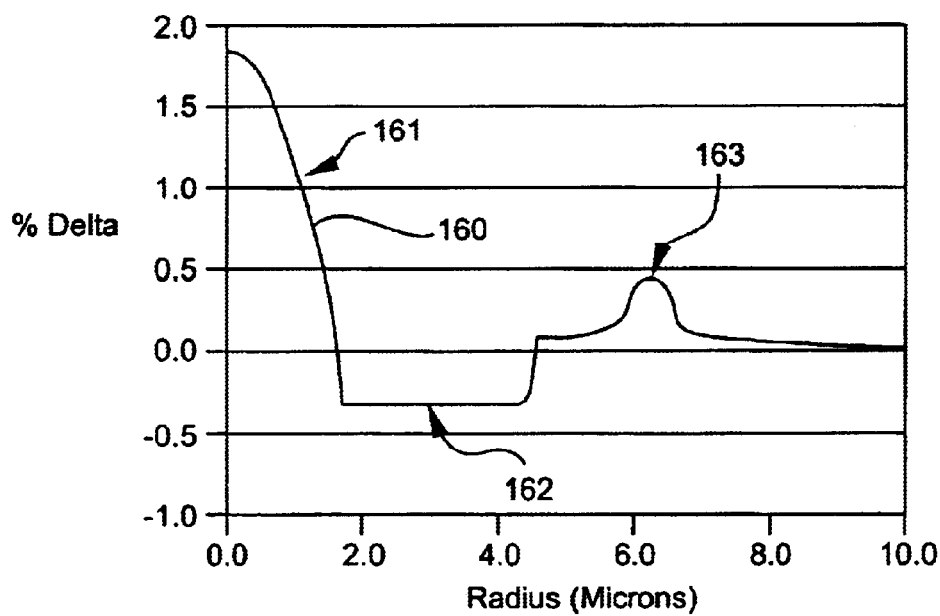
FIG. 29 shows the relative refractive index of another optical fiber, having negative dispersion and negative dispersion slope, to be fused to an end of a bridge fiber disclosed herein.

In one preferred embodiment, one end of the bridge fiber of FIG. 28 is fused to a fiber having negative dispersion and negative dispersion slope over the operating wavelength, for example as represented by the refractive index profile depicted as curve 160 in FIG. 29. The fiber represented by FIG. 29 has a central core segment 161 which extends to the radius where curve 160 first crosses the $\Delta$ %=0 axis to thereafter turn negative, an annular cylindrical moat segment 162 surrounding the central core segment 161 and preferably adjacent and abutting the central core segment 161 wherein the moat segment 162 extends to the radius where curve 160 again crosses the $\Delta$ %=0 axis to thereafter turn non-negative, and an annular ring segment 163 surrounding the moat segment. The ring segment 163 is further surrounded by a cladding. Cladding preferably extends to a radius of about 62.5 $\mu m$ from the centerline of the optical fiber. Preferably, the fiber represented by FIG. 29 has a central core segment with a maximum $\Delta$ % greater than about 1.5%, a moat segment with a $\Delta$ % more negative than about −0.2%, and ring segment with a maximum $\Delta$ % that is greater than about 0.3%. As shown by the exemplary profile in FIG. 29, central core segment has a maximum $\Delta$ % of about 1.9%, a moat segment with a $\Delta$ % of about −0.6%, and ring segment with a maximum $\Delta$ % of about 0.65%. Also, the fiber represented by FIG. 29 preferably has a central core segment having an outer radius R1 in a range of between about 1.5 $\mu m$ and 2 $\mu m$, a moat segment having an outer radius R2 in a range of between about 4 $\mu m$ and 5 $\mu m$, and a ring segment having a midpoint radius R3 in the range of between about 5.5 $\mu m$ and 7 $\mu m$. Aspects of the refractive index profile depicted in FIG. 29, such as the moat and ring location, could be made in order to adjust the desired dispersion slope and dispersion attributes of the optical fiber. For example, dispersion values in the range of −100 to −120 ps/nm-km at 1546 nm, and dispersion slope values in the range of about −0.29 to about −0.4 ps/nm$^2$-km can be achieved with the refractive index profile of FIG. 29.

In at least one preferred arrangement, the other end of the bridge fiber of FIG. 28 is connected to a positive dispersion fiber, such as a non-dispersion-shifted fiber ("NDSF") or such as a step index single mode fiber represented in FIG. 3 or FIG. 22, or other positive dispersion, positive slope fiber.

In one preferred embodiment, one end of the bridge fiber of FIG. 28 was fused to the negative dispersion, negative slope fiber represented by FIG. 29 using a Fujikura 30S splicer with an arc current of 40 bits for an arc time of 0.7 seconds, and the other end was fused to the positive dispersion, positive slope fiber represented by FIG. 22 using an Ericsson 995 splicer with an arc current of 15.5 mA for an arc time of 20 seconds. Table 11 shows the measured results for splice losses at several wavelengths for the splice (A) between the compensative fiber of FIG. 29 and the bridge fiber of FIG. 28.

TABLE 11

| Wavelength | 1520 nm | 1550 nm | 1570 nm |
|---|---|---|---|
| Splice A | 0.15 | 0.15 | 0.21 |

Table 12 shows the measured results for splice losses at several wavelengths for the splice (B) between the bridge fiber of FIG. 28 and the positive dispersion, positive slope fiber of FIG. 22.

TABLE 12

| Wavelength | 1480 nm | 1550 nm | 1610 nm |
|---|---|---|---|
| Splice B | 0.04 | 0.05 | 0.06 |

The total combined splice loss measured at 1550 nm for Splice A and Splice B for the bridge fiber of FIG. 28 was 0.2 dB. The absolute value of the maximum difference between the overall splice losses between 1520 and 1570 nm at Splice A was less than or equal to about 0.06 dB, and the absolute value of the maximum difference between the overall splice losses between 1480 and 1610 nm at Splice B was less than or equal to about 0.02 dB.

Figure 30:
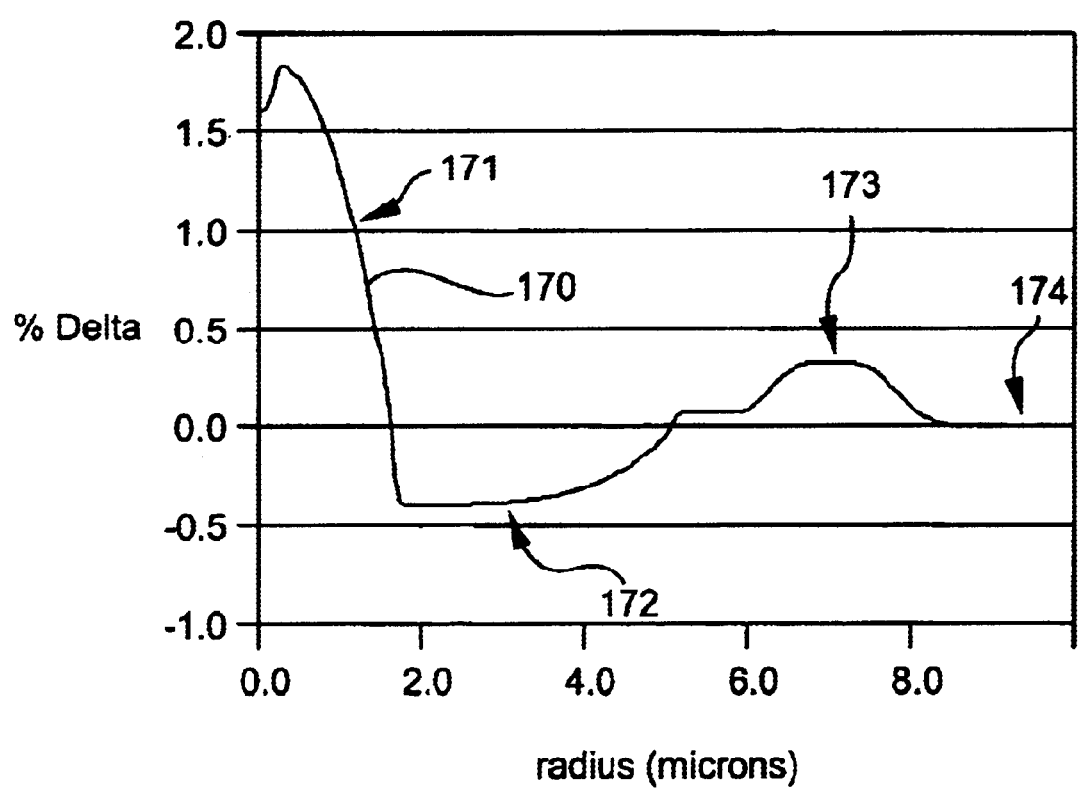
FIG. 30 shows the relative refractive index of yet another optical fiber, having negative dispersion and negative dispersion slope, to be fused to an end of a bridge fiber disclosed herein.

In another preferred embodiment, one end of the bridge fiber of FIG. 28 is fused to a fiber having negative dispersion and negative dispersion slope over the operating wavelength as represented by the refractive index profile depicted as curve 170 in FIG. 30. The fiber represented by FIG. 30 has a central core segment 171 which extends to the radius where curve 170 first crosses the Δ %=0 axis to thereafter turn negative, an annular cylindrical moat segment 172 surrounding the central core segment 171 and preferably adjacent and abutting the central core segment 171 wherein the moat segment 172 extends to the radius where curve 170 again crosses the Δ %=0 axis to thereafter turn non-negative, and an annular ring segment 173 surrounding the moat segment. The ring segment 173 is further surrounded by a cladding 174. Cladding preferably extends to a radius of about 62.5 μm from the centerline of the optical fiber. Preferably, the fiber represented by FIG. 30 has a central core segment with a maximum Δ % greater than about 1.5%, a moat segment with a Δ % less negative than about −0.65%, and ring segment with a maximum Δ % that is preferably greater than about 0.2%. As shown by the exemplary profile in FIG. 30, central core segment has a maximum Δ % of about 1.8%, a moat segment with a Δ % of about −0.4%, and ring segment with a maximum Δ % of about 0.33%. Also, the fiber represented by FIG. 29 preferably has a central core segment having an outer radius R1 in a range of between about 1.5 μm and 2 μm, a moat segment having an outer radius R2 in a range of between about 4 μm and 5 μm, and a ring segment having a endpoint radius R3 in the range of between about 7 μm and 9 μm. Aspects of the refractive index profile depicted in FIG. 30, such as the moat and ring location, could be made in order to adjust the desired dispersion slope and dispersion attributes of the optical fiber. For example, the exemplary profile of FIG. 30 exhibits a dispersion of about −95 ps/nm-km at 1525 nm, about −110 ps/nm-km at 1550 nm, and about −155 ps/nm-km at 1620 nm, and a dispersion slope of about −0.5 ps/nm²-km at 1520 nm, about −0.59 ps/nm²-km at 1550 nm, and about −0.59 ps/nm²-km at 1620 nm.

In at least one preferred arrangement, the other end of the bridge fiber of FIG. 28 is connected to a positive dispersion fiber, such as a non-dispersion-shifted fiber ("NDSF") or such as a step index single mode fiber represented in FIG. 3 or FIG. 22, or other positive dispersion, positive slope fiber.

According to one aspect disclosed herein, a bridge fiber is selected to match the E-field of the dispersion and/or slope compensative fiber, such that one end may be spliced to the compensative fiber by, for example, a tack splice, and the mode field diameter of the other end of the bridge fiber is expanded to match the positive dispersion fiber. The tack splice is typically a single pulse or arc sufficient to fuse the compensative fiber to the first end of the bridge fiber, but in any case, the fusing thereof preferably limits the diffusion of the dopants at that end of the bridge fiber (as well as the diffusion of the dopants in the abutting compensative fiber) to maintain the refractive index profiles of the compensative fiber and that end of the bridge fiber, thereby maximizing the E-field matching of the respective fibers at that end. Preferably the tack splice is effected by arcing of a fusion splicer for a duration of greater than about 0.5 seconds and less than about 3 seconds, more preferably greater than about 0.5 seconds and less than about 2 seconds. In particular embodiments, for example when matching the E-field of an optical fiber such as that represented in FIG. 2 having a certain refractive index profile with a depressed index region, a bridge fiber having a ring may be important in achieving an acceptable mode field and/or E-field matching. Thus, the connection between the two fibers should not result in significant deterioration of the ring upon fusion therebetween. The ring improves coupling between the electric fields of the bridge fiber and the compensative fiber, as disclosed herein. Ring height may be selected to increase or decrease MFD and/or to improve coupling to the compensative fiber.

The other end, or second end, of the bridge fiber may be, in a preferred embodiment, connected to a positive dispersion fiber or an NDSF or a step index single mode fiber for a longer splice time to allow mode field expansion of the respective end of the bridge fiber to more closely match that of that positive dispersion fiber. For example, the other end of the bridge fiber may be exposed to fusion temperatures for 3 to 30 seconds using conventional splicing techniques which involve a pulsed or steady state or continuous arcing for a short period of time, after which the arcing is terminated. Preferably, pre-splice mode field expansion as well as post-splice mode field expansion are avoided. Preferably, post-splice annealing is avoided as dislcosed herein. Furthermore, preferably, the mode field diameter of the bridge fiber is expanded at the second end at the fusion temperature thereof, and preferably not at a temperature or temperatures which would be considered to be below practical fusion temperatures, as disclosed herein.

In accordance with a preferred embodiment disclosed herein, the mode field diameter, or effective area, of the bridge fiber is selected to at least approximately match that of the compensative fiber. In preferred embodiments, the bridge fiber disclosed herein can be selected, for example, to have a mode field diameter of between 4–5 microns to match standard dispersion compensation fiber, or a mode field diameter of between 5 and 7 microns to match compensative fibers such as those found in FIG. 1 or FIG. 2. The cutoff wavelength for each of these exemplary embodiments would preferably be <1500 nm in a 5 m length. A preferred embodiment of the bridge fiber disclosed herein has a particular mode field diameter (or a given Aeff) for matching purposes, and the fiber is formed to have a selected cutoff wavelength suitable for the intended operating wavelength or range. A high germania content, as provided by the central core region and/or the ring or pedestal, can promote smooth mode field expansion between the bridge fiber disclosed herein and the positive dispersion fiber or NDSF.

The splice connection between the bridge fiber and the compensative fiber typically cannot withstand significant heating without loss of guiding power and subsequent high splice loss. Typically such splices require fine core alignment due to the small mode field diameter, followed by a splicing regimen that uses minimal heating. The splice connection between the bridge fiber and the NDSF fiber, on the other hand, benefits from a relatively prolonged heating regime that allows for expansion of the mode field diameter of the bridge fiber.

Pin array bend loss, or "pin array" for short, is a measure of the lateral load or macrobend resistance of a fiber or splice. Pin array typically increases with increasing wavelength for a given fiber. For example, the compensative fiber of FIG. 2 has pin array values of 2.6 dB at 1500 nm, 8 dB at 1550 nm and 22 dB at 1600 nm. Furthermore, pin array bend losses typically increase rapidly during splicing. A pin array increase of ten times after a 1 second arc splice, and an increase by a factor of 30 after 2 seconds of splicing, have been predicted for the compensative fiber of FIG. 2. Furthermore the wavelength dependence of the pin array may also create a significant taper loss if the baseline value in the spliced region is large around the operating window such as the 1550 nm window.

Thus, in preferred embodiments as disclosed herein, a relatively short duration splice and adequate E-field or MFD matching are preferable at the juncture between the compensative fiber (such as that represented in FIG. 1 or FIG. 2 or other compensative fiber) and the respective end of the bridge fiber, in order to prevent pin array bend loss from growing to unacceptable levels. For preferred embodiments such as those represented in FIG. 6, 11, or 16, the arc time required to achieve acceptable MFD growth may be on the order of, for example, 20 seconds long (e.g. 20 one-second duration arcs or one continuous 20 second arc) on the NDSF side, and the pin array may grow by as much as two orders of magnitude. In that case, the initial value of the pin array for the bridge fiber disclosed herein should be low. For example, the initial value of the pin array would preferably be <1 dB, and more preferably <0.1 dB.

As used herein, the term "matching" does not necessarily require an exact duplication to achieve acceptable and/or desired properties or performance. A balancing of factors such as E-field matching, minimization of overall splice loss, flatness of the splice loss with respect to wavelength, reduction of attenuation tilt, reduction of net gain tilt, minimization of pin array bend loss, and cutoff wavelength, may be appropriate for arriving at an acceptable refractive index profile suitable for connecting two optical fibers. Furthermore, a particular embodiment of a bridge fiber disclosed herein may be suitable for various combinations of various types of fiber. For example, the skilled artisan could determine whether fiber performances would be acceptable for implementation in a particular system. Furthermore, the mode field diameters of two fibers may be matched, i.e. the MFDs of the two fibers are similar or the same, while their respective refractive index profiles may not exactly match in shape. Moreover, mode field diameters may not match, but the E-fields may match closely, leading to E-field overlap integral values closer to 1, resulting in lower splice losses, either at a splice junction or across a fiber, or both.

The bridge fiber disclosed herein does not require a tapering of its core along a substantive portion of the fiber length prior to connection to another fiber. The optical fiber disclosed herein has a constant core diameter along its length before being spliced to any other fiber. The fiber disclosed herein preferably does not have a tapered core prior to splicing.

Furthermore, the fiber disclosed herein does not necessarily have an adiabatic tapered core over a substantive portion of its length, even after splicing. While an optical fiber disclosed herein could incorporate variations in core diameter along its length, production of a tapered core length and/or the formation of a tapered or adiabatic core, especially in the field, are not necessary as disclosed herein. Preferably the heated region or taper at a junction is between about 0.5 mm and about 5 mm in length and the heating is preferably only due to fusion splicing. In a preferred embodiment, the heated region at a junction is between about 1 mm and about 2 mm in length. For example, the fused junction between the positive dispersion fiber or NDSF and the bridge fiber, as disclosed herein, preferably has an adiabatic or nearly adiabatic junction as a result of fusion splicing only.

Heat treating of splices is time-consuming and may weaken the splice itself, possibly leading to more fiber breaks. As disclosed herein, preferably no heat treatment is performed upon the splice after fusion thereof, or, no post-splice annealing is performed on the spliced joint. Also, as disclosed herein, no pre-heating of any fiber is needed, such as to achieve an adiabatic taper.

Furthermore, as disclosed herein, the bridge fiber and any fiber fused thereto, preferably have essentially the same outside diameter of the outer cladding. The mode field matching and E-field matching are preferably not dependent upon alignment or abutment of fibers having different overall outside diameters. Therefore, ease of production of the bridge fiber as disclosed herein (e.g. a less complicated laydown scheme of doped silica) and ease of installation (e.g. eliminating a requirement of heating an entire length of bridge fiber, either pre-splice or post-splice) are allowed.

Preferably, as disclosed herein, robustness is exhibited across at least the C-band and the L-band, at least from 1530 nm to 1630 nm.

Preferred embodiments as disclosed herein are particularly well-suited for long-distance spans, especially underwater scenarios, where a mid-span splice box would be expensive and/or difficult to access. Optical fibers made as disclosed herein could also be used in longer lengths by itself or in combination with one or more fibers, and could serve as a transmission link fiber, although if the fiber were made with a relatively small mode field diameter, nonlinear effects could become significant. The fibers disclosed herein may also be used as repair fibers or in longer lengths to adjust the dispersion. As disclosed herein, fiber spans can comprise pre-spliced sections of a bridge fiber and a compensative fiber and/or an NDSF, e.g. to form and/or provide integrated fiber repair sections.

Also disclose herein are dispersion compensation modules which include one or more bridge fibers connected to a dispersion compensating fiber and a positive dispersion pigtail.

Preferably, the bridge fiber disclosed herein has a length less than about 50 m, more preferably less than about 20 m, even more preferably less than about 10 m. In a preferred embodiment, the bridge fiber has a length between about 1 m and about 6 m, more preferably between about 2 m and about 5 m.

It is to be understood that the foregoing description is exemplary of the invention only and is intended to provide an overview for the understanding of the nature and character of the invention as it is defined by the claims. The accompanying drawings are included to provide a further understanding of the embodiment, the bridge fiber has a length between about 1 m and about 6 m, more preferably between about 2 m and about 5 m nvention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A method of connecting optical fibers, the method comprising:
    providing a first optical fiber having a first refractive index profile;
    providing a second optical fiber having a second refractive index profile;
    determining the E-field overlap between the electric field of the first fiber and the electric field of the second fiber at a plurality of times and at one or more wavelengths for the first and second fibers; and selecting a first fusion time corresponding to a desired value of E-field overlap at one or more wavelengths.

2. The method of claim 1 further comprising:

abutting an end of the first fiber to an end of the second fiber; and heating the abutted ends of the first fiber and the second fiber at the fusion temperature for the first fusion time to form a first juncture.

3. The method of claim 1 wherein the first fusion time is selected to correspond to a minimum E-field overlap value for one or more wavelengths.

4. The method of claim 1 wherein the first junction comprises a taper having a length of less than about 5 mm.

5. The method of claim 1 wherein the heating of the abutted ends of the first fiber and the second fiber comprises a tack splice.

6. The method of claim 1 further comprising providing a third optical fiber;

determining the E-field overlap between the electric field of the second fiber and the electric field of the third fiber at a plurality of times and at one or more wavelengths for the second and third fibers;

selecting a second fusion time corresponding to a desired value of E-field overlap at one or more wavelengths;

abutting an end of the third fiber to an opposite end of the second fiber from the first junction; and heating the abutted ends of the second fiber and the third fiber at the fusion temperature for the second fusion time to form a second juncture.

7. The method of claim 6 wherein the second fusion time is selected to correspond to a minimum E-field overlap value for one or more wavelengths.

8. The method of claim 6 wherein the first and second fusion times are each selected to yield a minimum splice loss across the first and second junctions for one or more wavelengths.

9. The method of claim 1 further comprising connecting optical fibers, the method comprising:

prior to selecting a first fusion time;

determining the diffused refractive index profile, at a plurality of times and at one or more wavelengths, of the first fiber being subjected to a fusion temperature;

determining the diffused refractive index profile, at a plurality of times and at one or more wavelengths, of the second fiber being subjected to the fusion temperature;

determining the electric field of the first fiber at a plurality of times and at one or more wavelengths based upon the diffused refractive index profile of the first fiber as a function of time;

determining the electric field of the second fiber at a plurality of times and at one or more wavelengths based upon the diffused refractive index profile of the second fiber as a function of time; and determining the E-field overlap between the electric field of the first fiber and the electric field of the second fiber at a plurality of times and at one or more wavelengths for the first and second fibers.

10. The method of claim 9 further comprising:

abutting an end of the first fiber to an end of the second fiber; and heating the abutted ends of the first fiber and die second fiber at the fusion temperature for the first fusion time to form a first juncture.

11. The method of claim 9 further comprising:

providing a third optical fiber having a third refractive index profile;

determining the diffused refractive index profile, at a plurality of times and at one or more wavelengths, of the third fiber being subjected to a fusion temperature;

determining the electric field of the third fiber at a plurality of times and at one or more wavelengths based upon the diffused refractive index profile of the third fiber as a function of time;

determining the E-field overlap between the electric field of the second fiber and the electric field of the third fiber at a plurality of times and at one or more wavelengths for the second and third fibers; and selecting a second fusion time corresponding to a desired value of E-field overlap at one or more wavelengths.

12. The method of claim 1 further comprising:

abutting an end of the third fiber to an opposite end of the second fiber from the first junction; and heating the abutted ends of the second fiber and the third fiber at the fusion temperature for the second fusion time to form a second juncture.

13. An optical waveguide bridge fiber in combination with a first fiber and a second fiber, the first fiber having a first mode field diameter and positive dispersion in an operating wavelength region between about 1500 nm and about 1650 nm and the second fiber having a second mode field diameter and negative dispersion in the operating wavelength region, wherein one end of the bridge fiber is connected to the first fiber and the other end of the bridge fiber is connected to the second fiber, wherein the bridge fiber comprises at least two segments including:

a first segment extending radially outward from the centerline and having a positive relative refractive index percent, $\Delta_1$ %(r) with a maximum relative refractive index percent, $\Delta_1$, the central region containing no downdopant; and a second segment adjacent and surrounding the central region and having a non-zero refractive index percent, $\Delta_2$ %(r), with a maximum relative refractive index percent, $\Delta_2$, the second segment containing no downdopant wherein the ratio of $\Delta_2/\Delta_1$ is less than about 0.1, and wherein the second segment has a width of greater than about 1.5 $\mu$m; and an outer annular cladding region surrounding the inner annular region and having a relative refractive index percent, $\Delta_c$ %(r).

14. The combination of claim 13 wherein the bridge fiber has an uncabled fiber cutoff wavelength of less than or equal to about 1500 nm for a 2 m length of bridge fiber.

15. The combination of claim 13 wherein the length of the bridge fiber is less than or equal to about 50 m.

16. The combination of claim 13 wherein the first segment has an alpha greater than 1 and less than about 15.

17. The combination of claim 13 wherein the first segment has a $\Delta_1$ of less than about 1.5%.

18. The combination of claim 13 wherein the second segment has a positive relative refractive index percent of less than about 0.1%.

19. The combination of claim 13 wherein the second segment has a non-negative relative refractive index percent, and the second bridge fiber further comprises a third segment, adjacent and surrounding the second segment and having a positive relative refractive index percent.

20. The combination of claim 19 wherein the second segment has a relative refractive index percent of 0%.

21. The combination of claim 19 wherein the second segment has a positive relative refractive index percent of less than about 0.1%.

22. The combination of claim 19 wherein the third segment has a positive relative refractive index percent of less than about 0.4%.

23. An optical waveguide fiber span comprising:

a first fiber portion comprising:

a central core segment having a raised relative refractive index profile;

a first annular core segment surrounding the central core segment and having a depressed relative refractive index profile;

a second annular core segment surrounding the first annular core segment having a raised relative refractive index profile; and a second fiber portion joined to the first fiber portion at a first junction, the second fiber portion comprising:

a central core segment having a raised relative refractive index profile; and a first annular core segment surrounding the central core segment and having a non-negative relative refractive index profile;

wherein the E-field overlap at the first junction is between 0.95 and 1.00.

24. The span according to claim 23 wherein the second fiber portion contains no downdopants.

25. The span according to claim 23 wherein the second fiber portion contains no fluorine.

26. The span according to claim 23 wherein the second fiber portion further comprises a second annular core segment surrounding the first annular core segment, the second annular core segment having a raised relative refractive index profile and no downdopants.

27. The span according to claim 23 wherein the first fiber portion is fused to the second fiber portion.

28. The span according to claim 23 further comprising a third fiber portion joined to the second fiber portion at a second junction opposite the first junction, wherein the E-field overlap at the second junction is between 0.95 and 1.00.

29. A method of connecting optical waveguide fibers, the method comprising:

providing a first fiber;

providing a second fiber;

providing an intermediate fiber having a first end and a second end, wherein the intermediate fiber and the first fiber have a pre-splice E-field overlap of greater than about 0.95, and wherein the intermediate fiber and the second fiber have a pre-splice E-field overlap of greater than about 0.70;

fusing the first fiber to the intermediate fiber to form a first junction, wherein the intermediate fiber and the first fiber have a post-splice E-field overlap of greater than about 0.95; and fusing the second fiber to the intermediate fiber to form a second junction, wherein the intermediate fiber and the second fiber have a post-splice E-field overlap of greater than about 0.95.

30. The method of claim 29 wherein the splice loss at the second junction is less than about 0.20 dB at 1550 nm.

31. The method of claim 29 wherein the overall splice loss for the first and second junctions is less than or equal to about 0.30 dB.

32. The method of claim 29 wherein the overall splice loss for the first and second junctions is less than or equal to about 0.25 dB.

33. The method of claim 29 wherein the overall splice loss for the first and second junctions is less than or equal to about 0.20 dB.

34. The method of claim 29 wherein the intermediate fiber has an uncabled fiber cutoff wavelength of less than or equal to about 1500 nm for a 2 m length of intermediate fiber and wherein the length of the intermediate fiber is less than or equal to about 50 m.

35. The method of claim 29 wherein the intermediate fiber has an uncabled fiber cutoff wavelength of less than or equal to about 1500 nm for a length of bridge fiber greater than or equal to about 2 m.

36. A dispersion compensation module comprising:

a dispersion compensation fiber;

an NDSF fiber; and a bridge fiber having a first end connected to the dispersion compensation fiber and a second end connected to the NDSF;

wherein the splice loss attenuation across the dispersion compensation fiber, the bridge fiber and the NDSF is less than about 0.3 dB.

* * * * *

UNITED STATES PATENT AND TRADEMARK OFFICE
CERTIFICATE OF CORRECTION

PATENT NO. : 6,789,960 B2  Page 1 of 1
DATED : September 14, 2004
INVENTOR(S) : Bickham et al.

It is certified that error appears in the above-identified patent and that said Letters Patent is hereby corrected as shown below:

Title page,
Item [56], References Cited, FOREIGN PATENT DOCUMENTS, "36 09 409" should be -- 36 09 407 --
OTHER PUBLICATIONS, first reference, "K. Ando et al" should be -- Y. Ando et al. --

Signed and Sealed this

First Day of March, 2005

JON W. DUDAS
*Director of the United States Patent and Trademark Office*